(12) United States Patent
Day et al.

(10) Patent No.: US 10,642,527 B2
(45) Date of Patent: *May 5, 2020

(54) CHECK POINTING A SHIFT REGISTER WITH A CIRCULAR BUFFER

(71) Applicant: MIPS Tech, LLC, Santa Clara, CA (US)

(72) Inventors: Philip Day, London (GB); Julian Bailey, Watford (GB)

(73) Assignee: MIPS Tech, LLC, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/036,104

(22) Filed: Jul. 16, 2018

(65) Prior Publication Data

US 2018/0321852 A1    Nov. 8, 2018

Related U.S. Application Data

(63) Continuation of application No. 15/205,555, filed on Jul. 8, 2016, now Pat. No. 10,025,527.

(30) Foreign Application Priority Data

Jul. 8, 2015 (GB) .................................. 1511980.3
Jul. 8, 2015 (GB) .................................. 1511981.1
Sep. 30, 2015 (GB) .................................. 1517325.5

(51) Int. Cl.
*G06F 3/06* (2006.01)
*G06F 5/01* (2006.01)
(Continued)

(52) U.S. Cl.
CPC ............ *G06F 3/065* (2013.01); *G06F 3/0619* (2013.01); *G06F 3/0656* (2013.01);
(Continued)

(58) Field of Classification Search
CPC ..... G06F 9/3844; G06F 9/3851; G06F 9/3863
See application file for complete search history.

(56) References Cited

U.S. PATENT DOCUMENTS 5,285,527 A    2/1994   Crick et al.
6,745,323 B1   6/2004   Sinharoy
(Continued)

FOREIGN PATENT DOCUMENTS

WO    2012/145997 A1    11/2012

*Primary Examiner* — Edward J Dudek, Jr.
(74) *Attorney, Agent, or Firm* — Adams Intellex, PLC

(57) ABSTRACT

Hardware structures for check pointing a main shift register one or more times which include a circular buffer used to store the data elements most recently shifted onto the main shift register which has an extra data position for each check point and an extra data position for each restorable point in time; an update history shift register which has a data position for each check point which is used to store information indicating whether the circular buffer was updated in a particular clock cycle; a pointer that identifies a subset of the data positions of the circular buffer as active data positions; and check point generation logic that derives each check point by selecting a subset of the active data positions based on the information stored in the update history shift register.

26 Claims, 27 Drawing Sheets

(51) Int. Cl.
*G06F 9/30* (2018.01)
*G06F 9/38* (2018.01)

(52) U.S. Cl.
CPC .............. *G06F 3/0673* (2013.01); *G06F 5/01* (2013.01); *G06F 5/017* (2013.01); *G06F 9/30116* (2013.01); *G06F 9/30134* (2013.01); *G06F 9/3844* (2013.01); *G06F 9/3851* (2013.01); *G06F 9/3863* (2013.01)

(56) References Cited

U.S. PATENT DOCUMENTS

| | | | |
|---|---|---|---|
| 10,025,527 B2 * | 7/2018 | Day | G06F 3/0656 |
| 2004/0210749 A1 | 10/2004 | Biles | |
| 2005/0021898 A1 | 1/2005 | Alverson et al. | |
| 2005/0120191 A1 | 6/2005 | Akkary et al. | |
| 2010/0037036 A1 | 2/2010 | Herbert et al. | |
| 2010/0082953 A1 | 4/2010 | Chiu | |
| 2010/0161951 A1 | 6/2010 | Chiou et al. | |
| 2011/0087866 A1 | 4/2011 | Shah et al. | |
| 2013/0297911 A1 | 11/2013 | Rozas et al. | |
| 2015/0032997 A1 | 1/2015 | Eickemeyer et al. | |

\* cited by examiner

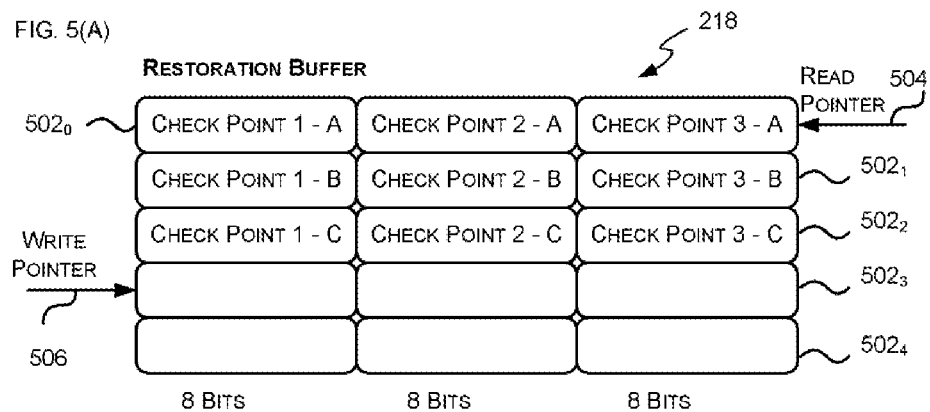
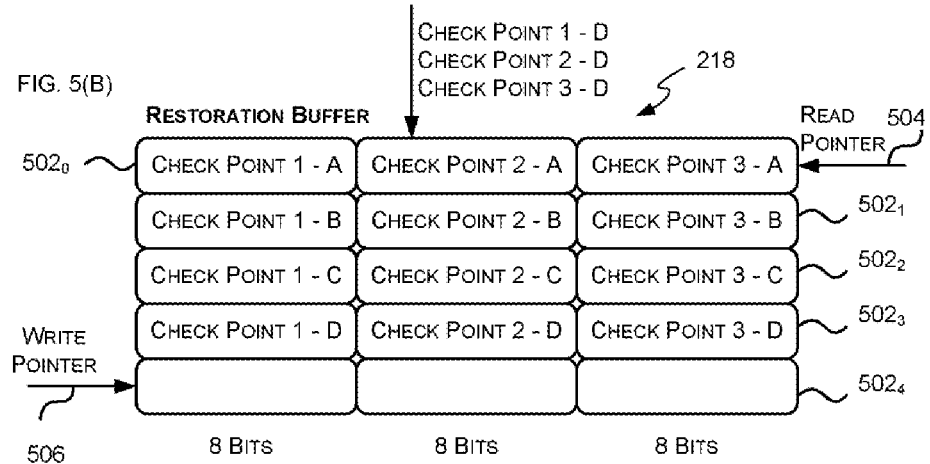
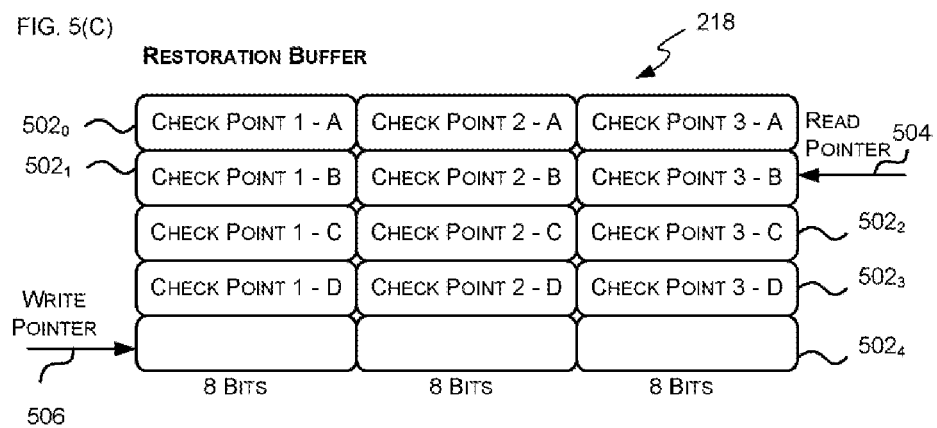

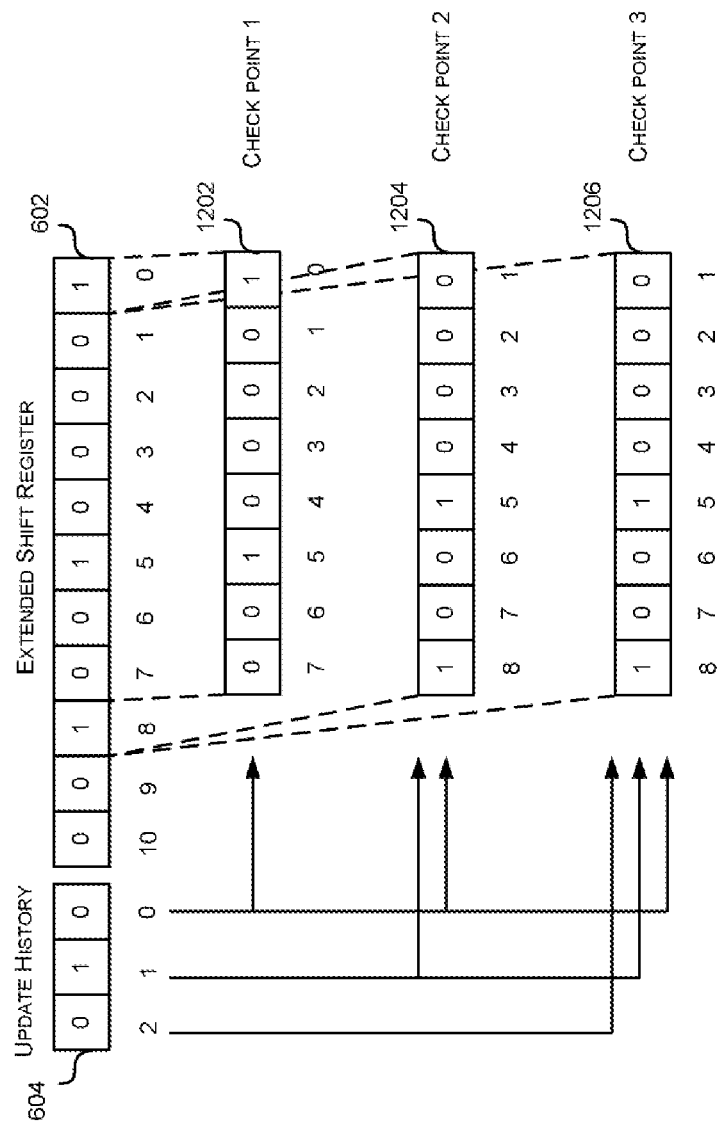

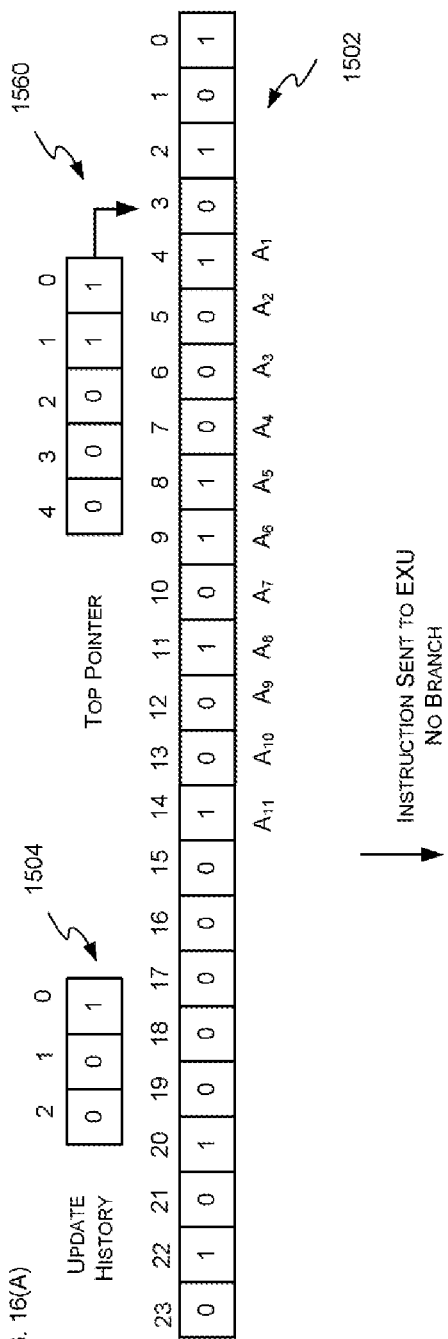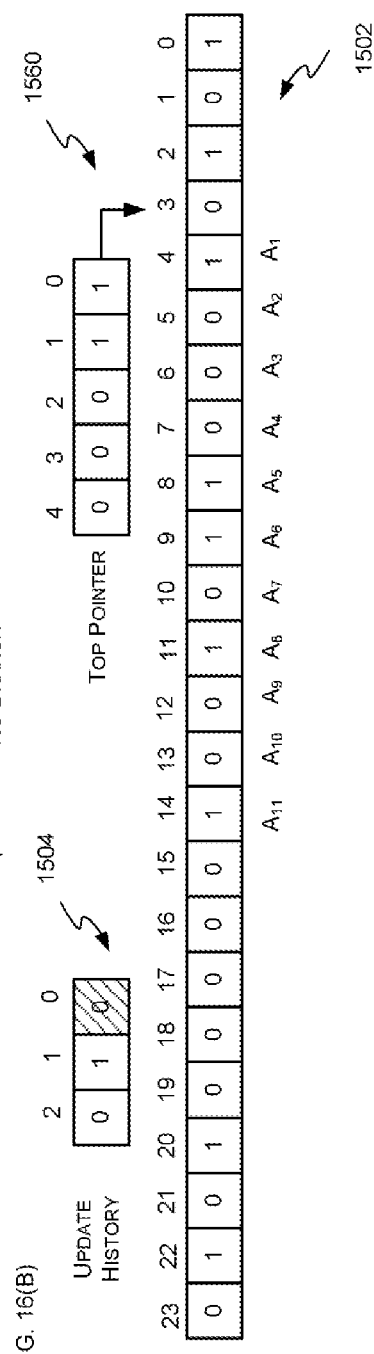

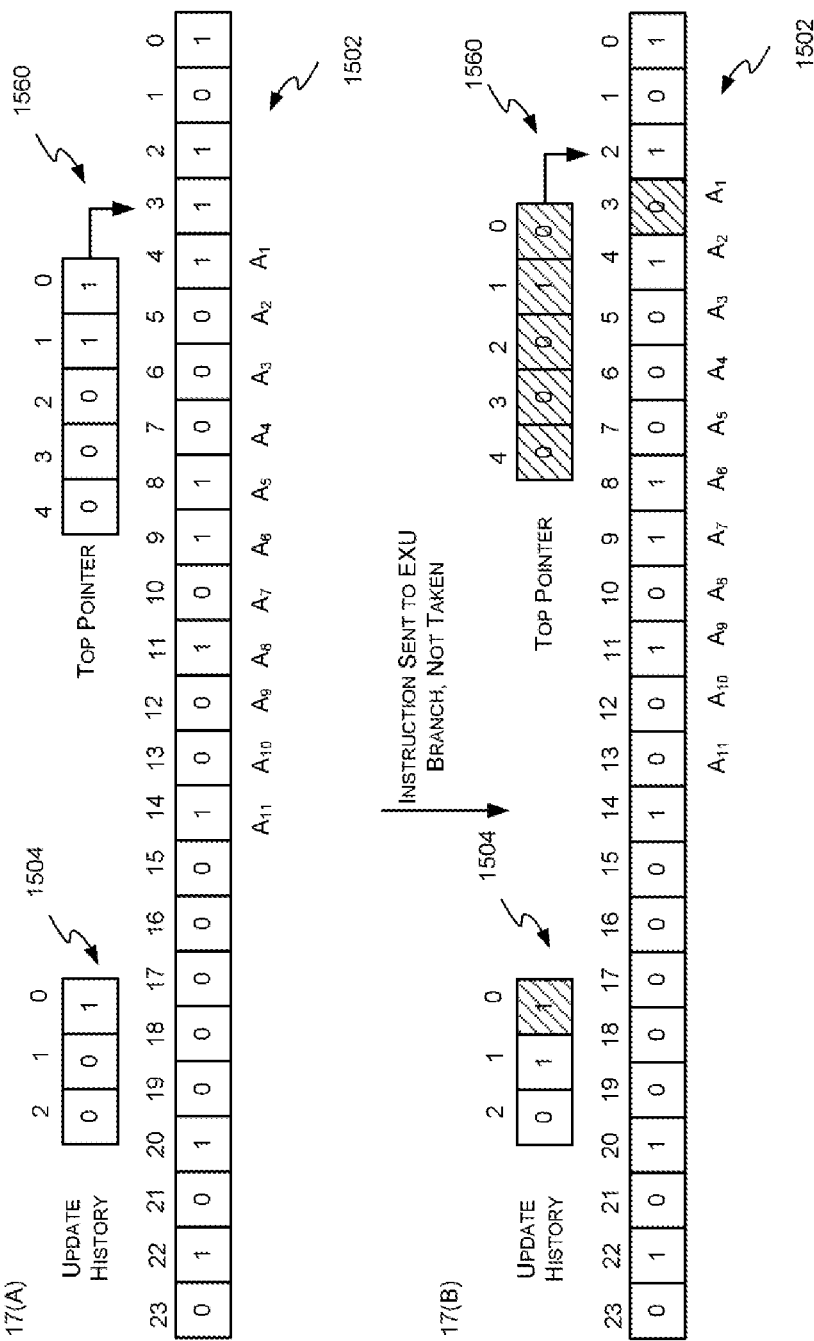

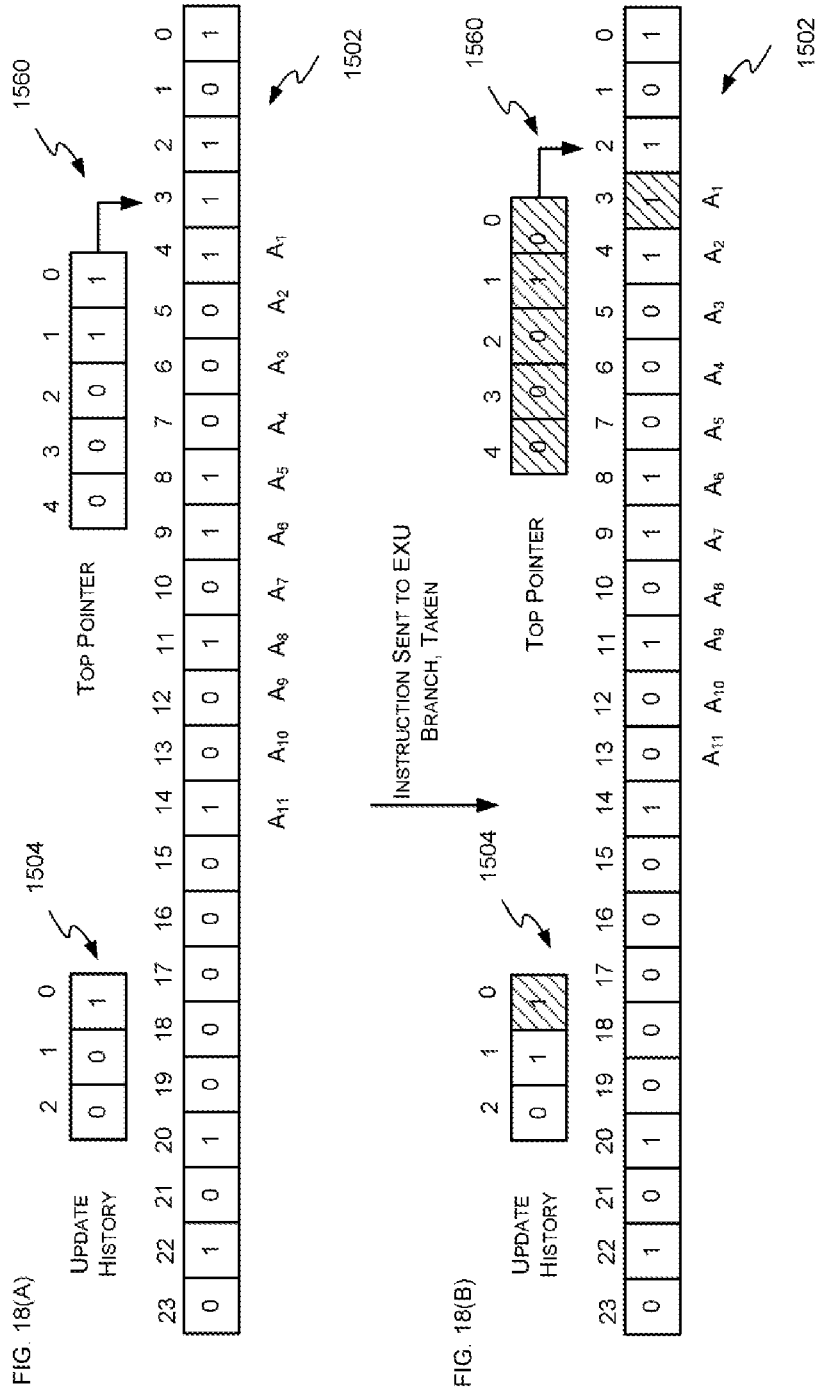

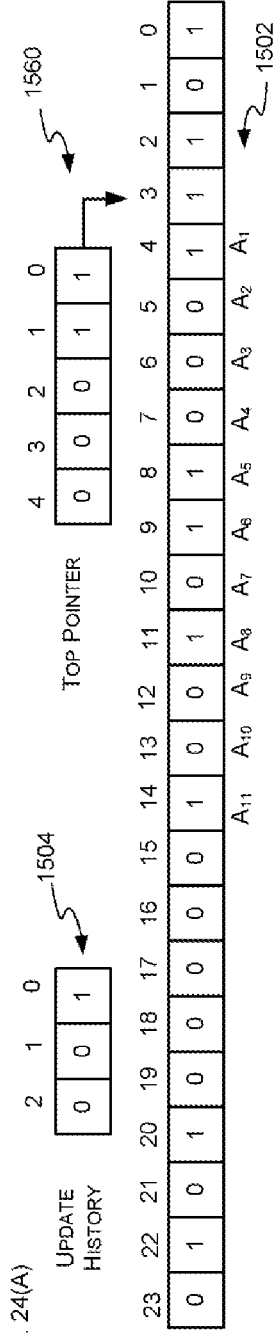
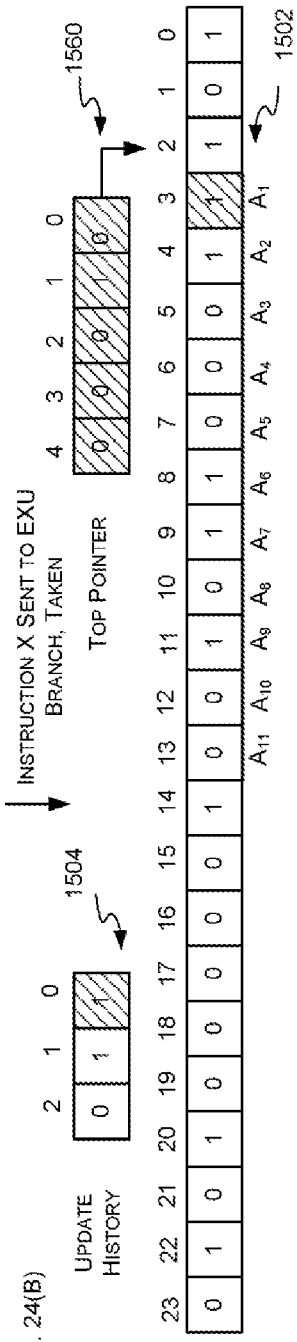
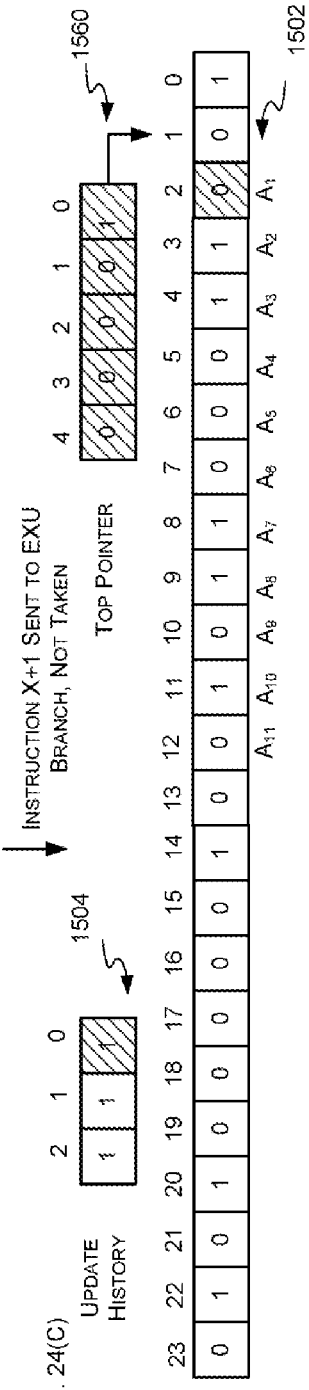
FIG. 24(A)
FIG. 24(B)
FIG. 24(C)

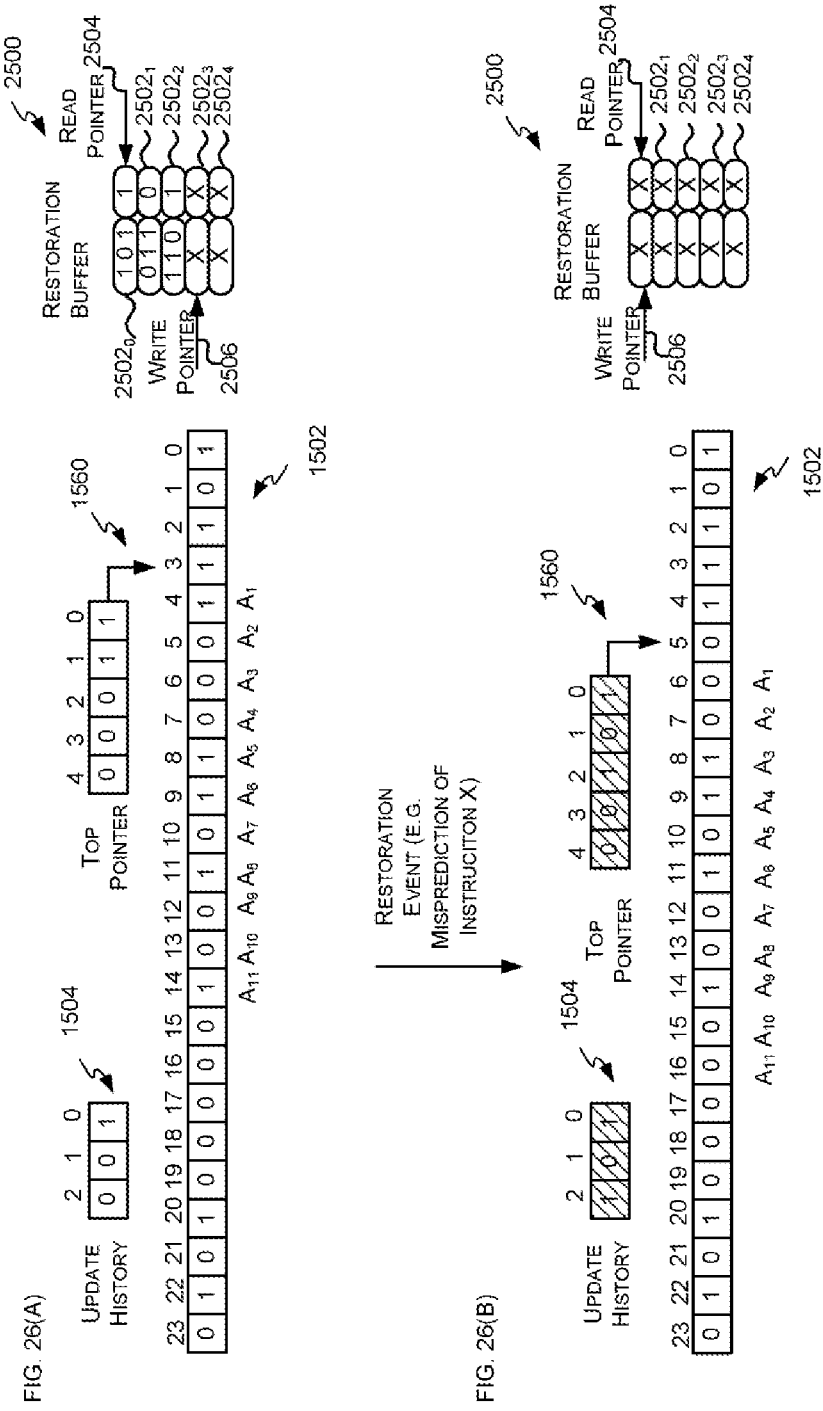

US 10,642,527 B2

CHECK POINTING A SHIFT REGISTER WITH A CIRCULAR BUFFER

RELATED APPLICATIONS

This application is a continuation of U.S. patent application "Check Pointing a Shift Register Using a Circular Buffer" Ser. No. 15/205,555 filed Jul. 8, 2016, which claims the benefit of G.B. patent applications "Check Pointing a Shift Register" App. No. 1511980.3, filed Jul. 8, 2015, "Check Pointing a Shift Register" App. No. 1511981.1, filed Jul. 8, 2015, and "Check Pointing a Shift Register" App. No. 1517325.5, filed Sep. 30, 2015.

Each of the foregoing applications is hereby incorporated by reference in its entirety.

FIELD OF ART

This application relates generally to logic circuitry and more particularly to check pointing a shift register with a circular buffer.

BACKGROUND

As is known to those of skill in the art, a shift register is a data structure for recording a predetermined number, N, of data elements in order. As a new data element is received at the shift register, the existing data elements in the shift register are "shifted" by one data position to make room for the new data element and the new data element is stored in the first data position of the shift register.

Where a shift register has only N data positions (and thus can only store N data elements), if the shift register already has N data elements when it receives a new data element, the last (or oldest) data element is shifted out of the shift register to make room for the new data element. The data element that is shifted out (and the information related thereto) is then lost. In some cases, however, it is important to know what a shift register looked like before it was updated or before a certain event occurs. In these cases a copy or snapshot of the shift register is taken and stored before the shift register is updated or the event occurs. This process of taking and storing a snapshot of the shift register is called check pointing the shift register.

The embodiments described below are provided by way of example only and are not limiting of implementations which solve any or all of the disadvantages of known methods of check pointing a shift register.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Described herein are methods and hardware structures for check pointing a main shift register one or more times. The hardware structure includes a circular buffer used to store the data elements most recently shifted onto the main shift register which has an extra data position for each check point and an extra data position for each restorable point in time; an update history shift register which has data positions for each check point which is used to store information indicating whether the circular buffer was updated in a particular clock cycle; a pointer that identifies a subset of the data positions of the circular buffer as active data positions; and a check point generation logic that derives each check point by selecting a subset of the active data positions based on the information stored in the update history shift register.

A first aspect provides a hardware structure to derive one or more check points for a main shift register having a predetermined number of data positions and being restorable to a plurality of points in time, the hardware structure comprising: a circular buffer comprising a data position for each data position of the main shift register, an additional data position for each check point, and an additional data position for each of the plurality of points in time, the data positions of the circular buffer storing data elements most recently shifted onto the main shift register; a pointer configured to identify a plurality of active data positions of the circular buffer, the active data positions comprising a subset of the data positions of the circular buffer storing the data elements most recently written to the circular buffer; an update history shift register having a data position for each check point, the data positions of the update history shift register storing information indicating whether the circular buffer was updated in a same clock cycle as a particular check point trigger event; and check point generation logic configured to derive each check point by selecting a subset of the active data positions based on the information stored in the update history shift register.

A second aspect provides a method to derive one or more check points for a main shift register having a predetermined number of data positions and being restorable to a plurality of periods of time, the method comprising: storing the predetermined number of data elements recently shifted onto the main shift register in a plurality of data positions of a circular buffer; storing an additional data element for each check point in an extra data position of the circular buffer; storing an additional data element for each period of time in the plurality of periods of time in an extra data position of the circular buffer; storing an index to the circular buffer in a pointer, the index identifying active data positions of the circular buffer; storing information indicating whether the circular buffer was updated in a same clock cycle as a particular check point trigger event in a data position of an update history shift register; and deriving each check point by selecting a subset of the active data positions based on the information stored in the update history shift register.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which:

FIGS. 5(A)-5(C) are schematic diagrams illustrating an example restoration buffer;

FIG. 12 is a schematic diagram of the check points that are obtained from an example extended shift register and an example update history shift register in accordance with the methods of FIGS. 9 to 11;

FIGS. 16(A) and 16(B) are schematic diagrams illustrating updating the circular buffer and the update history shift register after a non-branch instruction is sent to the execution unit;

FIGS. 17(A) and 17(B) are schematic diagrams illustrating updating the circular buffer and the update history shift register after a branch instruction is sent to the execution unit;

FIGS. 18(A) and 18(B) are schematic diagrams illustrating updating the circular buffer and the update history shift register after a branch instruction is sent to the execution unit;

FIGS. 24(A)-24(C) are schematic diagrams illustrating updating the pointer of FIG. 15 in response to a conditional branch instruction being issued to an execution unit for execution;

FIGS. 26(A) and 26(B) are schematic diagrams illustrating restoring the update history and the pointer of FIG. 15 using the restoration buffer of FIGS. 25(A)-25(C)

Figure 1:
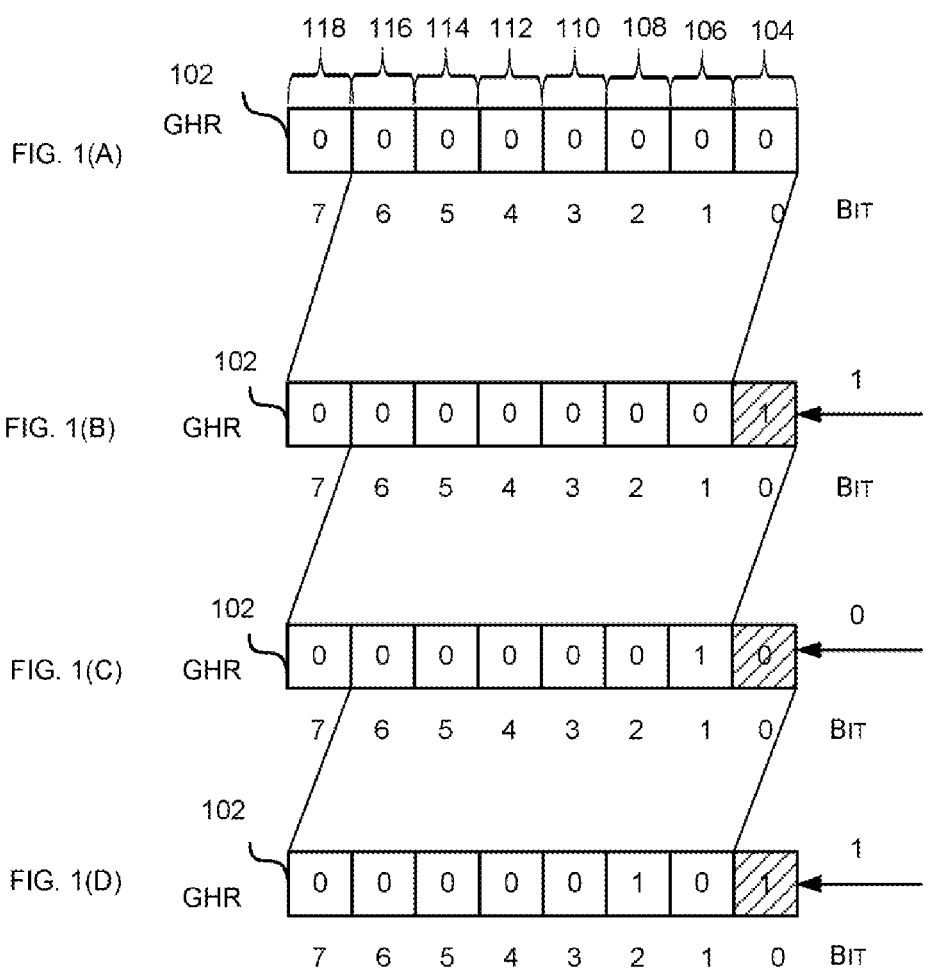
FIGS. 1(A)-1(D) are schematic diagrams illustrating an example global history register (GHR)

Common reference numerals are used throughout the figures to indicate similar features.

DETAILED DESCRIPTION

Embodiments of the present invention are described below by way of example only. These examples represent the various ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

Described herein are improved methods for check pointing a main shift register which use a small update history shift register to keep track of changes to the main shift register. Shift registers can be used in a processor for a variety of purposes. For example, a shift register can be used to store a history of the outcome (e.g. taken or not-taken) of the N most recent conditional branch instructions. Such a shift register is often referred to as a Global History Register (GHR). The improved check pointing methods will be described with reference to a GHR; however, it will be evident to a person of skill in the art that a GHR is only an example shift register and the improved check pointing methods may be applied to a variety of shift registers.

Reference is now made to FIGS. 1(A)-1(D) which illustrate an example GHR 102. In this example the GHR 102 comprises eight data positions (numbered 0 to 7) 104 to 118 which are used to store an ordered list of data elements. In this case each data element is a predicted outcome (taken/not-taken) of a conditional branch instruction so that the GHR 102 stores an ordered list of the eight most recently predicted outcomes (taken/not-taken) for a conditional branch instruction. It will be evident to a person of skill in the art that other shift registers and GHRs may have more or fewer of data positions.

In this example, the least significant data position 104 stores the most recently predicted outcome of a conditional branch instruction and the most significant data position 118 stores the oldest predicted outcome of a conditional branch instruction. However, it will be evident to a person of skill in the art that the data within the GHR may be arranged in another manner (e.g. the most significant data position may store the most recently predicted outcome of a conditional branch instruction).

In the example of FIGS. 1(A)-1(D) each data position 104 to 118 comprises a single bit which is used to store the predicted outcome ("1" or "0") of a conditional branch instruction. In particular, in this example, a one ("1") is used to indicate that the branch was predicted to be taken and a zero ("0") is used to indicate that the branch was predicted to be not taken. However, it will be evident to a person of skill in the art that other shift registers and GHRs may have a different number of bits per data position depending on the type of data stored.

As with any shift register, when the GHR 102 receives a new data element (e.g. bit) for insertion in the GHR 102, the existing data elements (e.g. bits) in the GHR 102 are "shifted" by one data position (e.g. bit) and the new data element is stored in the first data position. In particular, in FIGS. 1(A)-1(D) when the GHR 102 receives a new data element for insertion in the GHR 102 the data elements in the first seven data positions 104 to 116 are shifted by one data position to the next seven data positions 106 to 118 respectively and the new data element is inserted in the first data position 104 (while any data stored in the last data position 118 would be shifted out of the GHR 102).

This is illustrated in FIG. 1(A)-FIG. 1(D). For example, if the GHR 102 is initially set to all zeros as shown at FIG. 1(A), when the GHR 102 receives a new data element (a predicted outcome of "1") at FIG. 1(B), the data "0000000" in the first seven data positions 104 to 116 is shifted by one data position to the next seven data positions 106 to 118 respectively and the new data element (e.g. the new predicted outcome of "1") is placed in the first data position 104 so that the GHR 102 contains the data "00000001". If the GHR 102 subsequently receives a "0" to be inserted into the GHR 102 then the data in the first seven data positions 104 to 116 is similarly shifted by one data position and the new data element "0" is inserted in the first data position 104 so that the GHR contains the data "00000010" as shown at FIG. 1(C). Similarly, if the GHR 102 subsequently receives a "1" to be inserted into the GHR 102 then the data in the GHR 102 is again shifted by one data position and the new data element "1" is inserted in the first data position 104 so that the GHR contains the data "00000101" as shown at FIG. 1(D).

As described above, in some cases it is important to know what a shift register looked like before it was updated or before a certain event. For example, where the shift register is a GHR, it may be important to know what the GHR looked like before an instruction is sent to the execution unit for execution. In these cases, a copy or snapshot of the shift register is taken and stored to keep a picture of what the shift register looked like before the update or before a certain event. This process of taking and storing a snapshot of the shift register is called check pointing the shift register. Accordingly, an event (e.g. sending an instruction to the execution unit for execution) that triggers check pointing the shift register will be referred to herein as a check point trigger event.

Figure 2:
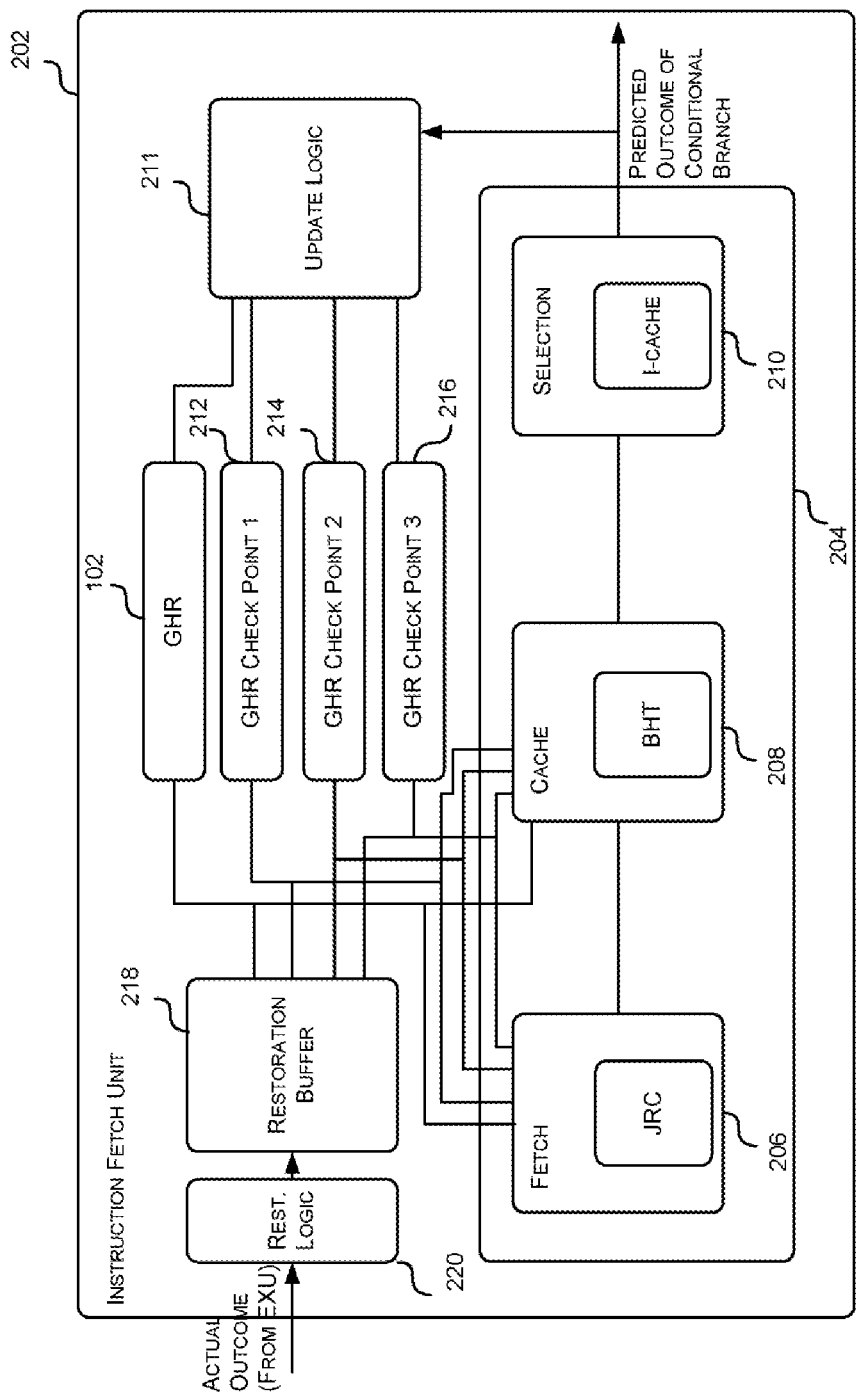
FIG. 2 is a block diagram of an example three-stage instruction fetch unit pipeline that uses the GHR of FIGS. 1(A)-1(D)

For example, as illustrated in FIG. 2, an instruction fetch unit (IFU) 202 of a multi-threaded processor may implement a pipelined (i.e. multi-cycle or multi-stage) process 204 for obtaining instructions from an instruction cache (i-cache) and predicting the outcome of conditional branch instructions using the GHR 102. In particular, in the example of FIG. 2, the pipelined process 204 comprises three stages—a fetch stage 206, a cache stage 208, and a selection stage 210; and both the fetch stage 206 and cache stage 208 use the GHR 102. For example, in the fetch stage 206 the GHR 102 may be used to generate an index for a jump register cache (JRC) and during the cache stage 208 the GHR 102 may be used to generate an index for a branch history table (BHT). At the end of the process 204, the GHR 102 is updated by update logic 211 to include the predicted outcome of any conditional branch instruction.

For the prediction method to work properly, the GHR value read by any stage in the pipelined process 204 has to be invariant, meaning that no matter what is happening in the pipeline (e.g. different threads fetching), the GHR value has to match the best case IFU performance (e.g. one thread fetching, no gaps in the fetch etc.). However, since the GHR 102 is updated and read in different cycles, this will not always be the case.

For example, since in this example the processor is multi-threaded, instructions from multiple threads may be interleaved in the pipelined process 204. Therefore, if in clock cycle A, a first instruction associated with a first thread is in the fetch stage 206, a second instruction associated with the first thread is in the cache stage 208, and a conditional branch instruction associated with a second thread is in the selection stage 210; in clock cycle A+1 the GHR 102 will be updated to include the predicted outcome of the conditional branch instruction associated with the second thread and cache stage 208 will read the updated GHR 102. However, the predicted outcome for the second stage which is included in the updated GHR 102 is not relevant for prediction of the outcome of the first or second instruction associated with the first thread.

Accordingly, to ensure that the prediction method works correctly, the GHR 102 is check pointed a number of times so that different stages of the pipelined process 204 can use different versions of the GHR as appropriate. The different versions of the GHR may be snapshots of the GHR prior to one more check point trigger events. In this example the GHR is check pointed each time the IFU sends an instruction to the execution unit for execution thus the check point trigger event is sending an instruction to the execution unit for execution, however in other examples other check point trigger events may be used. In this example, the GHR is check pointed three times, but in other examples the GHR or other shift register may be check pointed fewer or more times. The result of each check point may be stored in a separate check point register 212, 214, 216.

Figure 3:
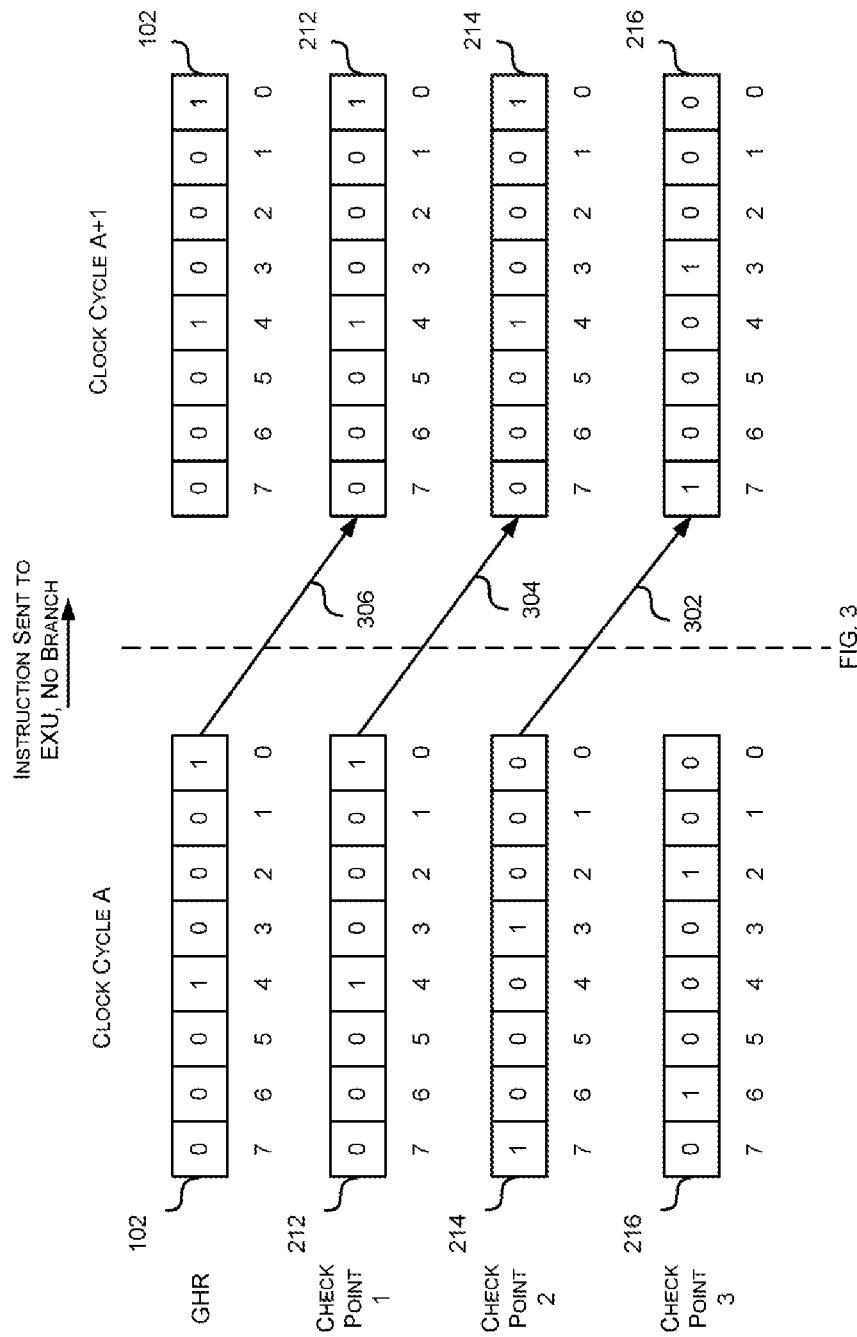
FIG. 3 is a schematic diagram illustrating check pointing the GHR of FIGS. 1(A)-1(D) after a non-branch instruction is sent to the execution unit.
Figure 4:
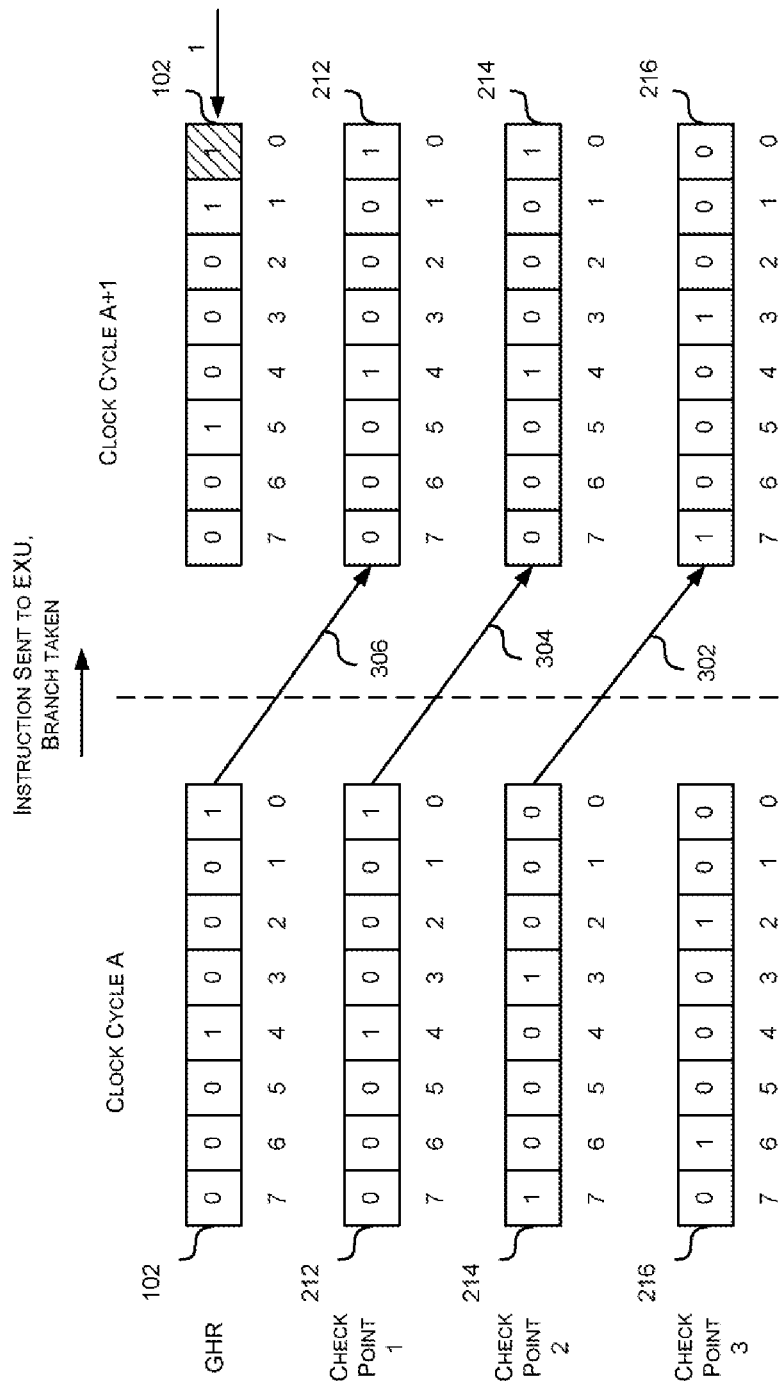
FIG. 4 is a schematic diagram illustrating check pointing the GHR of FIGS. 1(A)-1(D) after a branch instruction is sent to the execution unit.

Reference is now made to FIGS. 3 and 4 which illustrate check pointing the GHR. In these examples the GHR 102 is check pointed three times and the result of each check point is stored in a separate eight-bit check point register 212, 214 and 216. The first check point register 212 stores the GHR as it was one check point trigger event ago (e.g. before the most recent instruction was sent to the execution unit for execution); the second check point register 214 stores the GHR as it was two check point trigger events ago (e.g. before the two most recent instructions were sent to the execution unit for execution); and, the third check point register 216 stores the GHR as it was three check point trigger events ago (e.g. before the three most recent instructions were sent to the execution unit for execution).

Upon a check point trigger event occurring (e.g. an instruction being sent to the execution unit for execution) the data in the GHR 102, the first check point register 212 and the second check point register 214 are copied to the first, second and third check point registers 212, 214 and 216 respectively. Specifically, the data in the second check point register 214 is copied to the third check point register 216 as indicated at 302; the data in the first check point register 212 is copied to the second check point register 214 as indicated at 304; the data in the GHR 102 is copied into the first check point register 212 as indicated at 306; and when the instruction sent to the execution unit is a conditional branch instruction the GHR 102 is updated to include the predicted outcome of the conditional branch instruction, otherwise no change is made to the GHR 102. For example, in the example of FIG. 3, the instruction sent to the execution unit (EXU) was not a conditional branch instruction therefore in clock cycle A+1 the GHR 102 remains the same as in clock cycle A. In contrast, in the example of FIG. 4, the instruction sent to the execution unit (EXU) was a conditional branch instruction and the branch was predicted to be taken, thus a "1" is shifted onto the GHR 102 in clock cycle A+1.

Referring back to FIG. 2, when a mis-prediction occurs the IFU 202 restores the GHR 102 and the check point registers 212, 214 and 216 to what they were before the mis-predicted instruction was sent to the execution unit. To be able to restore the check point registers 212, 214 and 216 after a mis-prediction, the IFU 202 stores a copy of the data in the check point registers 212, 214 and 216 for each outstanding or in-flight conditional branch instruction (i.e. conditional branch instructions that have been predicted, but not yet executed) in a restoration buffer 218.

Reference is now made to FIGS. 5(A)-5(C) which illustrate an example restoration buffer 218. In the example of FIGS. 5(A)-5(C), the restoration buffer 218 is implemented as a FIFO (First In First Out) circular buffer comprising a plurality of data positions $502_0$ to $502_4$ each of which is used to store a copy of the three check point registers for a particular conditional branch instruction; a read pointer 504 which points to the data position $502_0$ to $502_4$ containing the check point register values for the oldest pending or outstanding conditional branch instruction (i.e. the conditional branch instruction predicted the longest ago); and a write pointer 506 which points to the next data position $502_0$ to $502_4$ to be written to.

In some cases when the IFU 202 makes a conditional branch prediction the data in the check point registers 212, 214 and 216 is pushed onto the restoration buffer 218. In particular, the data in the check point registers 212, 214 and 216 is written to the data position of the restoration buffer 218 indicated by the write pointer 506 and then the write pointer 506 is incremented to point to the next data position. For example, if the restoration buffer 218 has five data positions $502_0$ to $502_4$ and the read pointer 504 points to the first data position $502_0$ and the write pointer 506 points to the fourth data position $502_3$ as shown in FIG. 5(A), when the IFU 202 makes a branch prediction for conditional branch instruction D, then the data in the check point registers 212, 214 and 216, referred to as Check Point 1-D, Check Point 2-D and Check Point 3-D, are stored in the fourth data position $502_3$ as shown in FIG. 5(B) and the write pointer 506 is incremented to point to the fifth data position $502_4$.

When the IFU 202 receives information from the execution unit (EXU) (e.g. via restoration logic 220) indicating that a branch instruction has been executed the data in the data position $502_0$ to $502_4$ pointed to by the read pointer 504 is popped off the restoration buffer 218. In particular, the read pointer 504 is incremented to point to the next data position $502_0$ to $502_4$. For example, if the restoration buffer 218 has five data positions $502_0$-$502_4$ and the read pointer 504 points to the first data position $502_0$ and the write pointer 506 points to the fifth data position $502_4$ as shown in FIG. 5(B), when the IFU 202 receives information from the EXU indicating that branch instruction A has been executed, then the read pointer 504 is incremented to point to the second data position $502_1$ as shown in FIG. 5(C).

If the IFU 202 receives an indication that a mis-prediction has occurred, then the IFU 202 replaces the data in the check point registers 212, 214 and 216 with the data from top data position (the data position pointed to by the read pointer 504) and nullifies the entries in the restoration buffer 218.

The number of data positions in the restoration buffer 218 is typically equal to the maximum number of conditional branch instructions that can be outstanding or in-flight at any time (i.e. conditional branch instructions that have been predicted, but not yet executed) so that the IFU 202 is able to restore the check point registers to the proper state if any of the outstanding conditional branch instructions was mispredicted. Accordingly, the number of bits required for the restoration buffer 218 is equal to N*M*C where N is the number of bits of the GHR (and thus the number of bits for each check point register), M is the number of entries in the restoration buffer 218, and C is the number of check point registers. Therefore where N is equal to 8, M is equal to 16, and C is equal to 3, then the restoration buffer 218 requires 384 bits.

Due to the significant amount of duplication of information between the shift register (e.g. GHR) and the check point registers, check pointing a shift register by storing a copy of the shift register after multiple check point trigger events is inefficient. Specifically, in clock cycles where a check point trigger event occurs, but the shift register is not updated (e.g. when an instruction sent to the execution unit for execution, but the instruction is not a conditional branch instruction), the first check point will be equal to the shift register. Even in clock cycles where a check point trigger event occurs and the shift register (e.g. GHR 102) is updated (e.g. when a conditional branch instruction is sent to the execution unit for execution), the first check point will only differ from the shift register (e.g. GHR 102) by one data element (e.g. bit).

Accordingly, the present disclosure provides efficient methods and systems for check pointing a shift register, such as a GHR, which takes advantage of the duplication between the shift register and the check points. In these methods the main shift register is extended to record a longer history and a record of the updates to the main shift register is kept in a separate update history shift register and used to determine which bits of the extended shift register describe the current state of the main shift register and any check pointed states of the main shift register.

FIGS. 6-12 describe a first embodiment for check pointing a main shift register. In this embodiment, instead of storing a full copy of the main shift register for each check point, as described above with reference to FIGS. 2-5, the main shift register is extended to include an extra or additional data position (e.g. bit) for each check point and a record of whether an update was made to the main shift register for each of the C previous check point trigger events is maintained in a separate update history shift register where C is the number of check points. The current state of the main shift register and the check points can then be identified from the extended shift register and the update history shift register.

Figure 6:
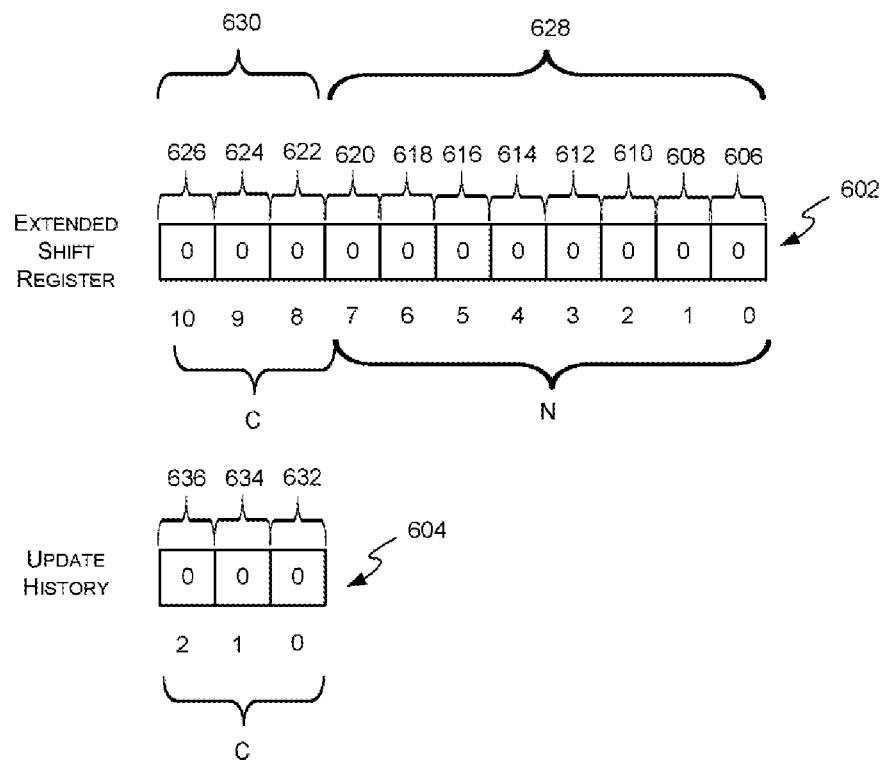
FIG. 6 is a schematic diagram illustrating an extended shift register and an update history shift register.

FIG. 6 illustrates an example structure of an extended shift register 602 and an update history shift register 604. In this example, the main shift register is a GHR, but it will be evident to a person of skill in the art that the methods and principles described herein could be equally applied to check point other shift registers.

The extended shift register 602 comprises N+C data positions 606 to 626, where N is the number of data positions in the main shift register and C is the number of check points. Accordingly the extended shift register 602 comprises a data position 606 to 620 for each data position in the main shift register and an additional data position 622 to 626 for each check point. The extended shift register 602 is updated as described above with reference to FIGS. 1(A)-1(D). In particular, when a new data element is received at the extended shift register 602, the data elements in the extended shift register 602 are shifted one data position and the new data element is inserted in the first data position. For example, if new a data element arrives, the data elements in data positions 606 to 624 are shifted to data positions 608 to 626 respectively and the new data element is inserted in the first data position 606.

The data positions 606 to 626 of the extended shift register 602 are divided into two subsets 628 and 630. The first subset 628 comprises the N data positions holding the newest data elements (i.e. the data elements most recently added to the main shift register) and represents the current state of the main shift register (e.g. GHR). The second subset 630 comprises the C data positions holding the oldest data elements and is used, in conjunction with the update history shift register 604, to identify the check points for the main shift register.

For example, where the main shift register is an 8-bit GHR (N=8) which is to be checked pointed three times (C=3), then the extended shift register 602 comprises eleven bits which represent the eleven most recently predicted conditional branch outcomes. The first subset 628 of data positions of the extended shift register 602 comprises the eight most recently predicted conditional branch outcomes, and the second subset 630 of data positions of the extended shift register 602 comprises the three oldest predicted conditional branch outcomes (i.e. the outcomes that were predicted the longest time ago).

The update history shift register 604 is a shift register that comprises C data positions 632 to 636 where C is the number of check points. Each data position comprises information that indicates whether the extended shift register 602 was updated a certain number of check point trigger events ago. In particular, the first data position 632 comprises information that indicates whether the extended shift register 602 was updated after the last check point trigger event; the second data position 634 comprises information that indicates whether the extended shift register 602 was updated two check point trigger events ago; and so on.

For example, where the main shift register is a GHR which is to be check pointed three times (C=3), then the update history shift register 604 comprises three bits which indicate which of the last three instructions sent to the execution unit were branch instructions. In particular, the first bit 632 indicates whether the last instruction sent to the execution unit for execution was a conditional branch instruction (thus the outcome was predicted and the extended shift register 602 updated); the second bit 634 indicates whether the second to last instruction sent to the execution unit for execution was a conditional branch instruction (thus the outcome was predicted and the extended shift register 602 updated); and the third bit 636 indicates whether the third to last instruction sent to the execution unit for execution was a conditional branch instruction (thus the outcome was predicted and the extended shift register 602 updated).

Figure 7:
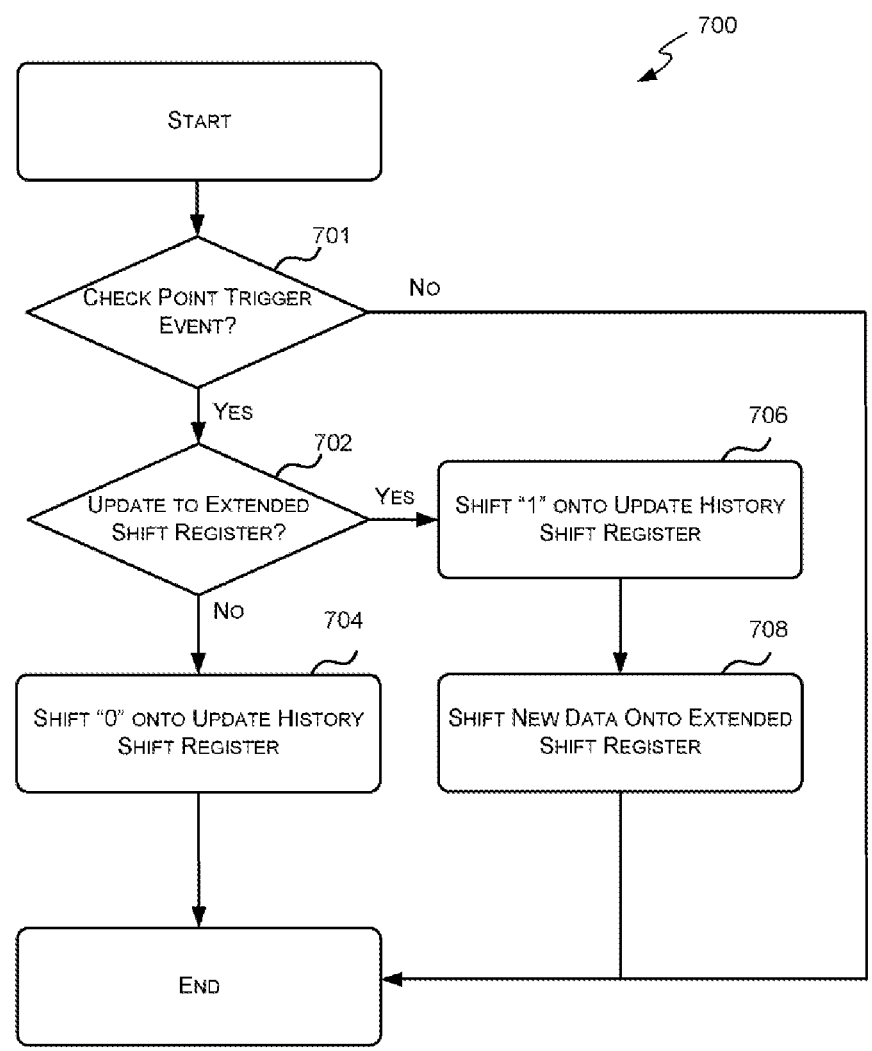
FIG. 7 is a flow diagram of an example method for updating the extended shift register and the update history shift register of FIG. 6.
Figure 8:
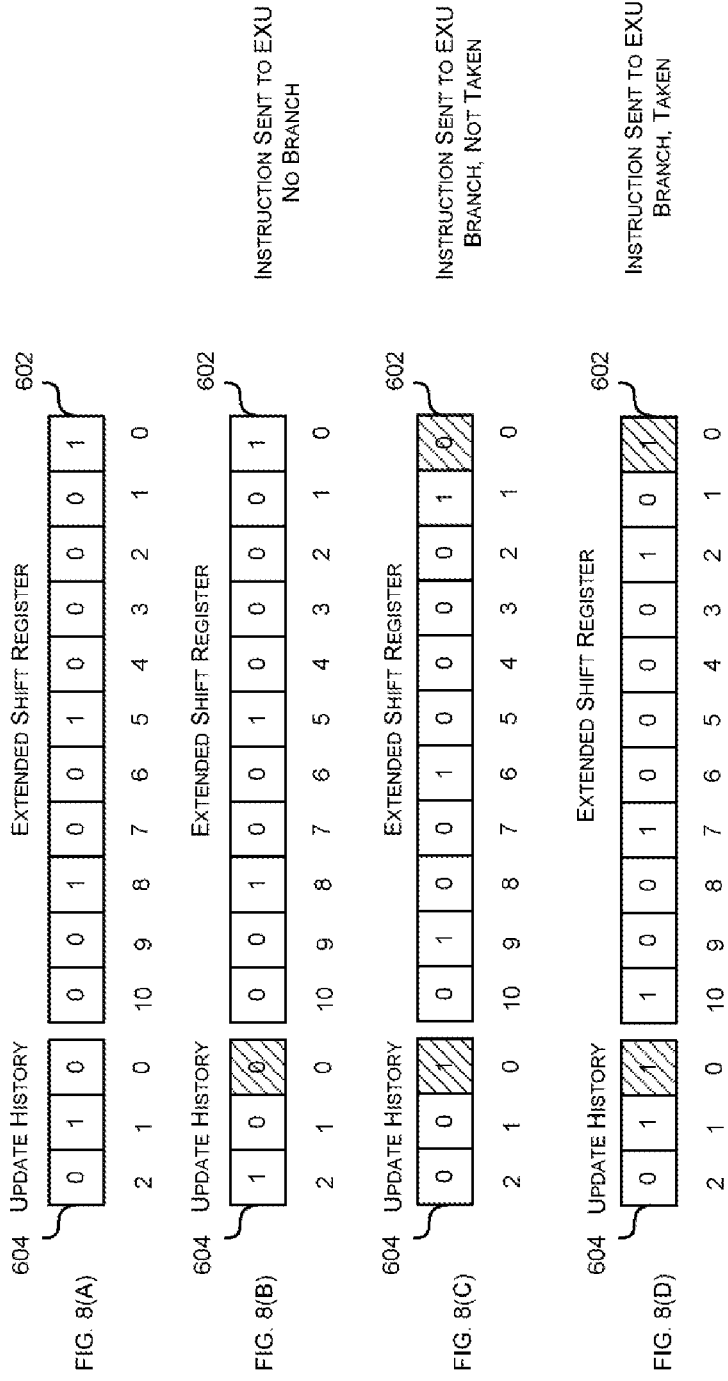
FIGS. 8(A)-8(D) are schematic diagrams illustrating updating the extended shift register and the update history shift register of FIG. 6 using the method of FIG. 7.

FIG. 7 shows an example method 700 for updating the extended shift register 602 and the update history shift register 604 which may be executed at each clock cycle by update logic (not shown). The method 700 begins at block 701 where the update logic determines whether a check point trigger event has occurred. Where the main shift register is a GHR, the check point trigger event may be when an instruction is sent to the execution unit for execution. However, it will be evident to a person of skill in the art that other check point trigger events may be used depending on the purpose and use of the shift register. If it is determined that a check point trigger event has occurred, then the method 700 proceeds to block 702. If, however, it is determined that a check point trigger event has not occurred then the method 700 ends.

At block 702, the update logic determines whether the extended shift register is updated in the current clock cycle. This may comprise determining whether there is a new data element to be shifted onto the extended shift register 602. Where the main shift register is a GHR, then determining whether the extended shift register is updated may comprise determining whether the outcome of a conditional branch instruction has been predicted (i.e. whether the instruction sent to the instruction unit is a conditional branch instruction).

If it is determined that the extended shift register 602 is not updated in the current clock cycle, then the method proceeds to block 704 where data is shifted onto the update history shift register 604 to indicate that the extended shift register 602 was not updated. In some cases, a "0" indicates that the extended shift register 602 was not updated and a "1" indicates that the extended shift register 602 was updated. In these cases, at block 704 a "0" is shifted onto the update history shift register 604. No change is made to the extended shift register 602. For example, if the main shift register is a GHR and the extended shift register 602 and update history shift register 604 are as shown in FIG. 8(A), then if no branch is predicted in the current clock cycle (and thus no update to the extended shift register 602) then a "0" is shifted on to the update history shift register 604 as shown in FIG. 8(B). In particular, the data elements/information in bits 0 and 1 of the update history shift register 604 are shifted to bits 1 and 2 respectively and a "0" is inserted in bit 0.

If, however, it is determined that the extended shift register 602 is updated in the current clock cycle, then the method 700 proceeds to blocks 706 and 708 where data is shifted onto the update history shift register 604 to indicate that the extended shift register was updated, and the extended shift register 602 is updated to include the new data element (e.g. predicted outcome of a conditional branch instruction). In some cases, a "0" indicates that the extended shift register was not updated and a "1" indicates the extended shift register was updated. In these cases, at block 706 a "1" is shifted onto the update history shift register 604. For example, if the main shift register is a GHR and the extended shift register 602 and update history shift register 604 are as shown in FIG. 8(B), and a branch is predicted to be not taken, then a "1" is shifted on to the update history shift register 604 and a "0" is shifted onto the extended shift register 602 as shown in FIG. 8(C). Similarly, if the main shift register is a GHR and the extended shift register 602 and update history shift register 604 are as shown in FIG. 8(C) and a branch is predicted to be taken, then a "1" is shifted onto the update history shift register 604 and a "1" is shifted onto the extended shift register 602 as shown in FIG. 8(D).

As noted above, the check point(s) for the main shift register (e.g. GHR) may be derived from the update history shift register 604 and the extended shift register 602. In particular, check point generation logic (not shown) is configured to derive each check point by selecting a subset of the data positions 606 to 626 in the extended shift register 602 based on the information stored in the update history shift register 604.

For example, the check point generation logic may be configured to select a subset of the data positions 606 to 626 that is offset from the first subset 628 of data positions by none, one, or more than one data position based on the information stored in the update history shift register 604. The offset to be used for a particular checkpoint is based on the number of relevant data positions (e.g. bits) of the update history shift register 604 that indicate that an update was made to the extended shift register 602 in the corresponding clock cycle.

The relevant data positions (e.g. bits) of the update history shift register 604 for a check point is based on the level or number of the check point. In particular, the relevant data positions (e.g. bits) of the update history shift register 604 for a check point are the data positions (e.g. bits) up to and including the level of the check point. As described above, each check point represents the value or data elements of the main shift register (e.g. GHR) a predetermined number of check point trigger events ago. The level of number of the check point is equal to the predetermined number of check point trigger events. For example, check point 1 represents the value or data elements of the main shift register (e.g. GHR) one check point trigger event ago thus check point 1 is a level 1 check point; and check point 3 represents the value or data elements of the main shift register (e.g. GHR) three check point trigger events ago. Thus, check point 3 is a level 3 check point.

Accordingly, the offset to be used for a particular check point is based on the number of data positions (e.g. bits) of the update history shift register 604 up to and including the level of the check point. For example, for a level 1 check point (e.g. check point 1) only the first data position of the update history shift register 604 is relevant and for a level 2 check point (e.g. check point 2) only the first two data positions of the update history shift register 604 are relevant. Therefore for a level 1 check point (e.g. check point 1) the offset is determined from the information in the first data position 632 of the update history shift register 604; and for a level 2 check point (e.g. check point 2) the offset is determined from the information in the first two bits of the update history shift register 604.

The offset is then equal to the number or count of the relevant data positions of the update history shift register 604 that indicate the extended shift register 602 was updated in the same clock cycle as the corresponding check point trigger event. For example, if only one of the relevant positions of the update history shift register 604 comprises information indicating the extended shift register 602 was updated in the same clock cycle as the corresponding check point trigger event (e.g. is set to "1"), then the subset of data positions for the check point is shifted one data position relative to the first subset 628 of data positions so that the check point comprises the first data position in the second subset 630 of data positions and N−1 data positions from the first subset 628 of data positions. If only two of the relevant data positions of the update history shift register 604 comprise information indicating the extended shift register 602 was updated in the same clock cycle as the corresponding check point trigger event, then the subset of data positions for the check point is shifted two data positions relative to the first subset 629 of data position so that the check point comprises the first two data positions from the second subset 630 of data positions and N−2 data positions from the first subset 628 of data positions.

Figure 9:
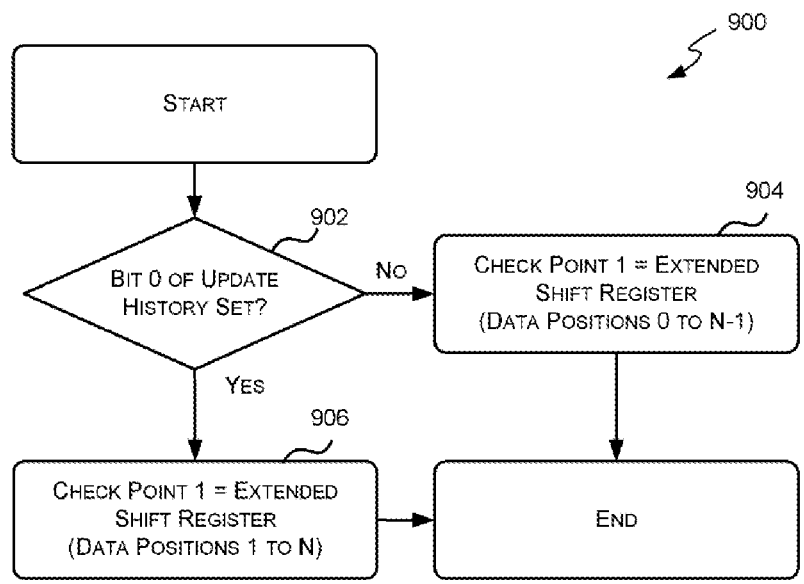
FIG. 9 is a flow diagram of an example method for obtaining the first check point from the extended shift register and the update history shift register of FIG. 6.
Figure 10:
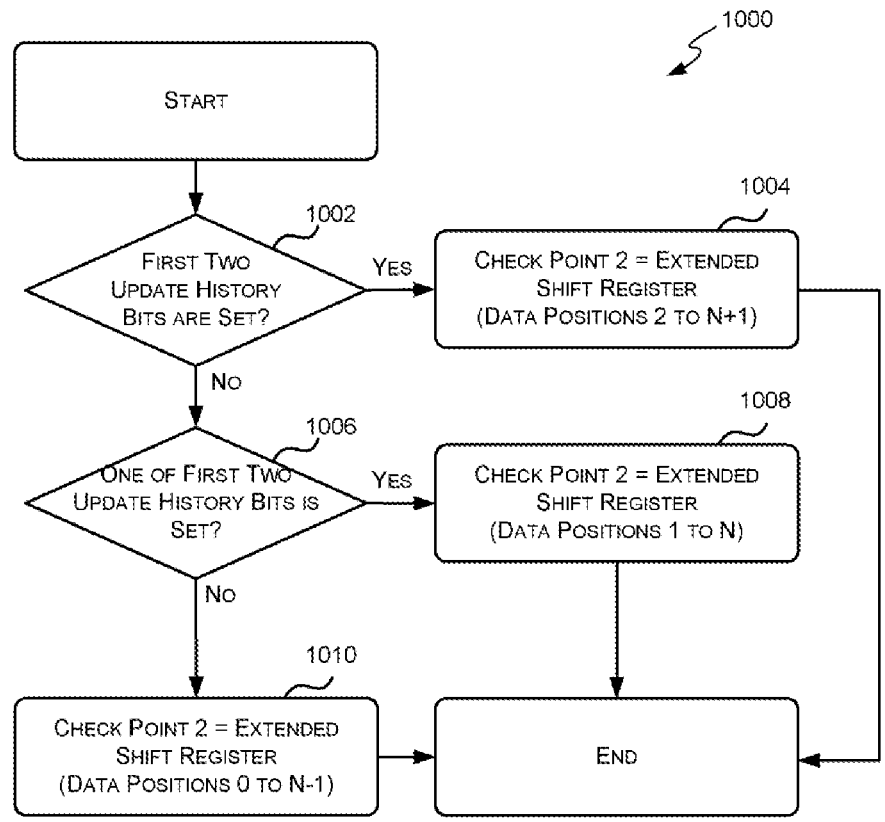
FIG. 10 is a flow diagram of an example method for obtaining the second check point from the extended shift register and the update history shift register of FIG. 6.
Figure 11:
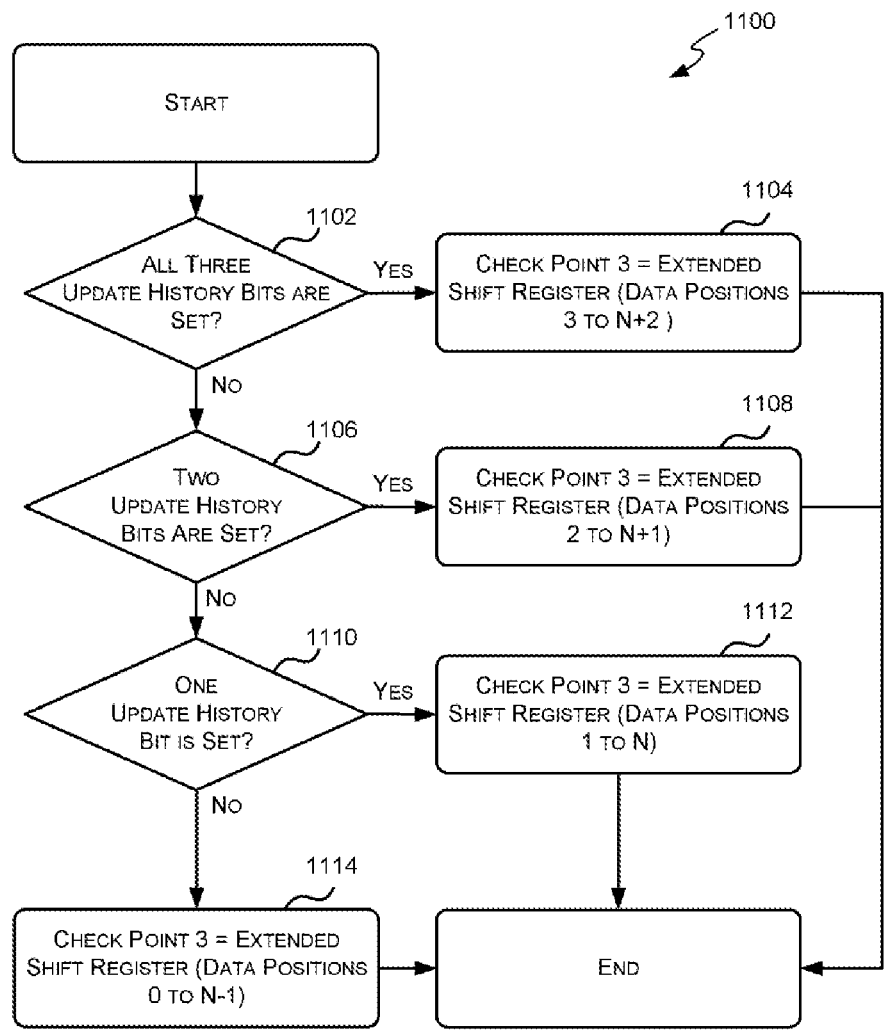
FIG. 11 is a flow diagram of an example method for obtaining the third check point from the extended shift register and the update history shift register of FIG. 6.

FIGS. 9-11 illustrate example methods for generating first, second, and third check points from the extended shift register 602 and the update history shift register 604 using these principles, as further shown in FIG. 12. In particular, FIG. 9 illustrates an example method for generating check point 1 from the extended shift register 602 and the update history shift register 604 described above. Since check point 1 is a level 1 check point, it is only the first bit (bit 0 or data position 632) of the update history shift register 604 that is relevant in determining the offset.

The method 900 begins at block 902 where it is determined whether the first bit (e.g. bit 0 or data position 632) of the update history shift register 604 is set. Where a "1" is used to indicate that the extended shift register 602 was updated, then determining whether the first bit of the update history shift register 604 is set may comprise determining if the first bit is set to 1.

If it is determined that the first bit of the update history shift register 604 is not set, then the method 900 proceeds to block 904 where check point 1 is set to data positions 0 to N−1 (the first subset 628 of data positions) of the extended shift register 602. If, however, it is determined that the first bit of the update history shift register 604 is set, then the method 900 proceeds to block 906 where check point 1 is set to data positions 1 to N (the first data position from the second subset 630+the next N−1 data positions of the first subset 628) of the extended shift register 602. Accordingly, in this case, check point 1 is offset from the first subset of data positions by one data position.

For example, if the main shift register is an 8-bit GHR (N=8) that is to be check pointed 3 times (C=3) and the extended shift register 602 and update history shift register 604 are as shown in FIG. 12, then according to method 900 of FIG. 9 check point 1 (indicated by numeral 1202 on FIG. 12) will be equal to the first 8 bits (bits 0 to 7) of the extended shift register 602 since the first bit of the update history shift register 604 is not set.

FIG. 10 illustrates an example method 1000 for generating check point 2 from the extended shift register 602 and the update history shift register 604 described above. The method 1000 begins at block 1002 where it is determined whether both of the first two bits of the update history shift register 604 are set. If it is determined that both of the first two bits of the update history shift register 604 are set, the method 1000 proceeds to block 1004 where check point 2 is generated from the data elements in data positions 2 to N+1. Accordingly, in this case, check point 2 is offset from the first subset 628 of data positions by two data positions.

If, however, it is determined that both of the first two bits of the update history shift register are not set, then the method 1000 proceeds to block 1006 where is it determined whether one of the first two bits of the update history shift register 604 is set. If it is determined that one of the first two bits of the update history shift register is set, the method 1000 proceeds to block 1008 where check point 2 is generated from the data elements in data positions 1 to N. Accordingly, in this case, check point 2 is offset from the first subset 628 of data positions by one data position.

If, however, it is determined that neither of the first two bits of the update history shift register 604 are set, then the method 1000 proceeds to block 1010 where check point 2 is generated from the data elements in data positions 0 to N−1 (i.e. the first subset 628 of data positions). Accordingly, in this case, check point 2 is offset from the first subset 628 of data positions by zero data positions.

For example, if the main shift register is an 8-bit GHR (N=8) that is to be check pointed 3 times (C=3) and the extended shift register 602 and update history shift register 604 are as shown in FIG. 12, then according to method 1000 of FIG. 10 check point 2 (indicated by numeral 1204) will be equal to bits 1 to 8 of the extended shift register 602 since only one of the first two bits of the update history shift register 604 is set.

FIG. 11 illustrates an example method 1100 for generating check point 3 from the extended shift register 602 and the update history shift register 604 described above. The method 1100 begins at block 1102 where it is determined whether all of the first three bits of the update history shift register are set. If it is determined that all of the first three bits of the update history shift register are set, the method 1100 proceeds to block 1104 where check point 3 is generated from the data elements in data positions 3 to N+2. Accordingly, in this case, check point 3 is offset from the first subset 628 of data positions by three data positions.

If, however, it is determined that all of the first three bits of the update history shift register 604 are not set, the method 1100 proceeds to block 1106 where it is determined whether two of the first three bits of the update history shift register are set. If it is determined that two of the first three bits of the update history shift register 604 are set, the method 1100 proceeds to block 1108 where check point 3 is generated from the data elements in data positions 2 to N+1. Accordingly, in this case, check point 3 is offset from the first subset 628 of data positions by two data positions.

If, however, it is determined that less than two of the first three bits of the update history shift register 604 are set, then the method 1100 proceeds to block 1110 where it is determined whether one of the first three bits of the update history shift register 604 is set. If it is determined that one of the first three bits of the update history shift register 604 is set, the method 1100 proceeds to block 1112 where check point 3 is generated from the data elements in data positions 1 to N. Accordingly, in this case, check point 3 is offset from the first subset 628 of data positions by one data position.

If, however, it is determined that none of the first three bits of the update history shift register 604 are set, then the method 1100 proceeds to block 1114 where check point 3 is generated from the data elements in data positions 0 to N−1 (i.e. the first subset 628 of data positions). Accordingly, in this case, check point 3 is offset from the first subset 628 of data positions by zero data positions.

For example, if the main shift register is an 8-bit GHR (N=8) that is to be check pointed 3 times (C=3) and the extended shift register 602 and update history shift register 604 are as shown in FIG. 12 then according to method 1100 of FIG. 11 check point 3 (indicated by numeral 1206) will be equal to bits 1 to 8 of the extended shift register 602 since only one of the first two bits of the update history shift register 604 is set.

When an extended shift register 602 and update history shift register 604 are used to check point a main shift register (e.g. GHR), then to be able to restore the check points to a previous point in time (e.g. after a branch mis-prediction), instead of storing a copy of all the check points in a restoration buffer as described above with reference to FIGS. 5(A)-5(C), only the update history shift register 604 and the extended shift register 602 are stored in the restoration buffer for each relevant point in time (e.g. before a conditional branch instruction is issued to the execution unit).

Figure 13A:
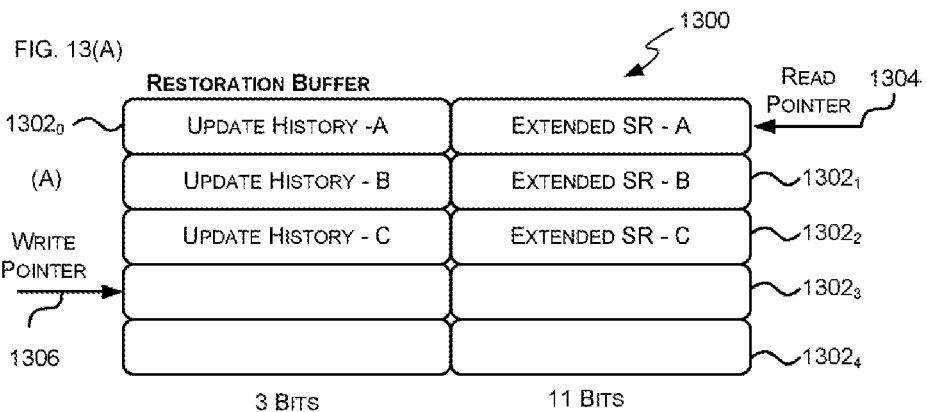
FIGS. 13(A)-13(C) are schematic diagrams of an example restoration buffer for restoring the extended shift register and the update history shift register of FIG. 6.
Figure 13B:
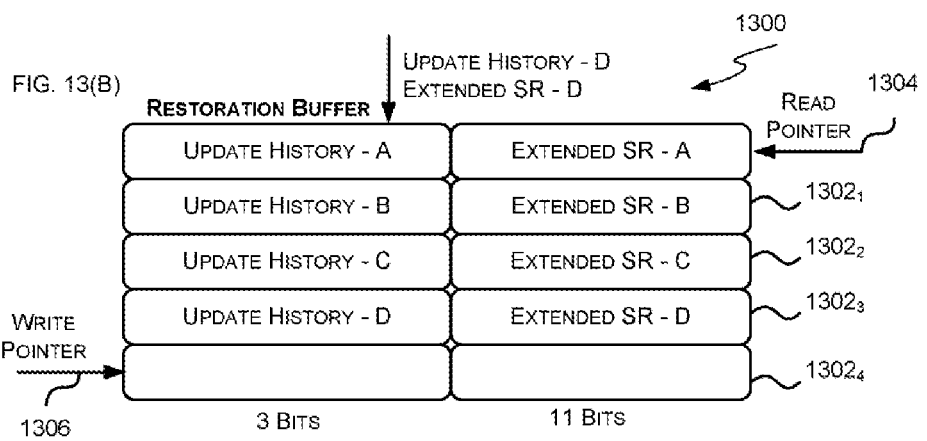
Figure 13C:
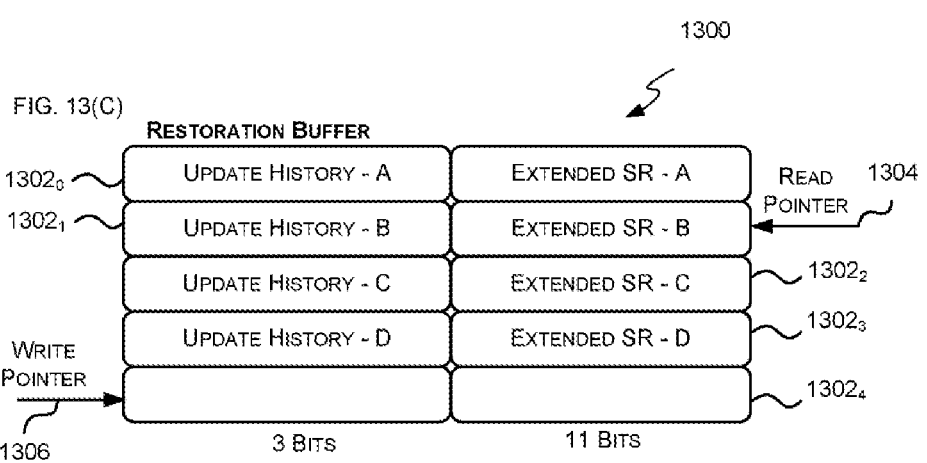

Reference is now made to FIGS. 13(A)-13(C) which illustrate an example restoration buffer 1300 for storing the update history shift register 604 and extended shift register 602 at particular points of time (e.g. before a conditional branch instruction is sent to the execution unit for execution) to allow the main shift register (e.g. GHR) and check points to be restored to that point in time (e.g. after a mis-prediction of a conditional branch instruction). Like the restoration buffer 218 of FIGS. 5(A)-5(C) the restoration buffer 1300 is implemented as a FIFO circular buffer comprising a plurality of data positions $1302_0$ to $1302_4$, each of which is used to store a copy of the update history shift register 604 and extended shift register 602 at a particular point in time (e.g. before a conditional branch instruction is issued to the execution unit); a read pointer 1304 which points to the data position $1302_0$ to $1302_4$ containing the update history shift register 604 and extended shift register for the oldest point in time (e.g. corresponding to the point in time before the oldest outstanding conditional branch instruction was issued to the execution unit); and a write pointer 1306 which points to the next data position $1302_0$ to $1302_4$ to be written to.

Each time an update trigger event happens (e.g. IFU 202 predicts the outcome of a conditional branch instruction) update logic (not shown) pushes the information in the update history shift register 604 and the data elements in the extended shift register 602 onto the restoration buffer 1300. In particular, the information in the update history shift register 604 and the data elements stored in the extended shift register 602 are written to the data position indicated by the write pointer 1306 and then the write pointer 1306 is incremented to point to the next data position. For example, if the restoration buffer 1300 is as shown in FIG. 13(A) when the update trigger event happens (e.g. IFU 202 predicts the outcome for conditional branch instruction D) then the information in the update history shift register 604 and the data elements stored in the extended shift register 602 are stored in the data position pointed to by the write pointer 1306 and then the write pointer 1306 is incremented to point to the next data position as shown in FIG. 13(B).

Each time the update logic (not shown) receives a removal trigger (e.g. information is received from the execution unit (EXU) indicating that a branch instruction has been executed) the update logic pops off the data elements in the data position $1302_0$ to $1302_4$ pointed to by the read pointer 1304 from the restoration buffer 1300. This may be done by incrementing the read pointer 1304 to point to the next data position $1302_0$ to $1302_4$. For example, if the restoration buffer 1300 is as shown in (B) of FIG. 13, when a removal trigger is received (e.g. information from the EXU indicating that branch instruction A has been executed is received), then the read pointer 1304 is incremented to point to the next data position as shown in FIG. 13(C).

If restoration logic (not shown) receives a restoration trigger (e.g. an indication that a mis-prediction has occurred), then the restoration logic replaces the information in the update history shift register 604 and the data elements in the extended shift register 602 with the data from the top data position (the data position pointed to by the read pointer 1304) and then nullifies the entries in the restoration buffer 1300.

In this example each data position in the restoration buffer 1300 has C bits (for the update history shift register)+N+C bits (for the extended shift register). Where there are M data positions in the restoration buffer, the total number of bits for the restoration buffer is then M*(2C+N). So, where C is 3, N is 8, and M is 16, the total number of bits for the restoration buffer 1300 is 224. Accordingly check pointing a shift register using an update history shift register and an extended shift register provides a significant cost savings in terms of storage for the restoration buffer 1300 as compared to using the check pointing method described above with reference to FIGS. 1 to 5.

It will be evident to a person of skill in the art that the structure of the restoration buffer 1300 in FIGS. 13(A)-13(C) is an example only and the restoration buffer may take another form (e.g. the restoration may be implemented as an indexed buffer or table).

Figure 14:
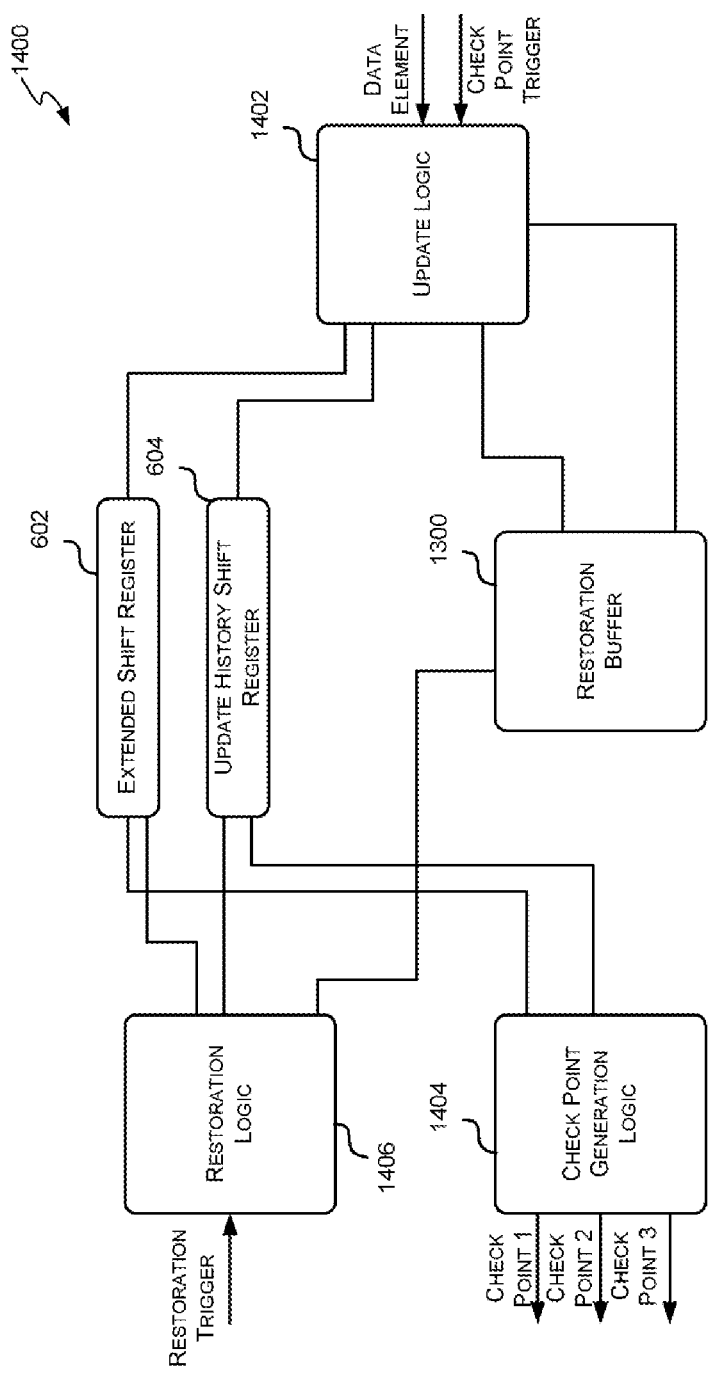
FIG. 14 is a block diagram of an example hardware structure for check pointing a shift register.

Reference is now made to FIG. 14 which illustrates an example hardware structure 1400 for implementing the shift register check pointing method described above with reference to FIGS. 6 to 13. The hardware structure comprises the extended shift register 602, the update history shift register 604, and the restoration buffer 1300 described above.

The hardware structure also comprises update logic 1402 for updating the extended shift register 602, update history shift register 604, and restoration buffer 1300 as described above. In particular, the update logic is configured to receive new data elements for the main shift register (e.g. GHR) and update the extended shift register 602, the update history shift register 604, and the restoration buffer 1300 accordingly as described with reference to FIGS. 7, 8, and 13. For example, where the shift register being check pointed is a GHR, the new data elements to be added to the GHR may be the predicted outcome of a conditional branch instruction.

The hardware structure 1400 also comprises check point generation logic 1404 for generating the check points and/or main shift register from the extended shift register 602 and the update history shift register 604 as described above with reference to FIGS. 9-11. For example, the check point generation logic 1404 may be configured to implement one or more of the methods described with reference to FIGS. 9 to 11.

The hardware structure 1400 may also comprise restoration logic 1406 for replacing the information in the extended shift register 602 and the update history shift register 604 with the information stored in the restoration buffer 1300 upon a restoration trigger event (e.g. mis-prediction of a conditional branch instruction) occurring as described above with reference to FIGS. 13(A)-13(C).

FIGS. 15 to 26 describe a second embodiment for check pointing a shift register. The second embodiment, like the first embodiment (described above with respect to FIGS. 6 to 14), uses an update history shift register to keep track of which of the previous C check point trigger events also resulted in an update to the main shift register; and an extended shift register. However, instead of the extended shift register comprising an extra data position (e.g. bit) for each check point, the extended shift register is implemented as a circular buffer that has M+C extra data positions where M is the number of different snapshots of the shift register and check points that can be restored (e.g. the number of branch instructions that can be outstanding or in-flight at any time) and C is the number of check points. Accordingly, where there can be a maximum of thirteen conditional branch instructions outstanding or in-flight at any one time (M=13), and there are three checkpoints (C=3), the circular buffer comprises 16 extra data positions.

Figure 15:
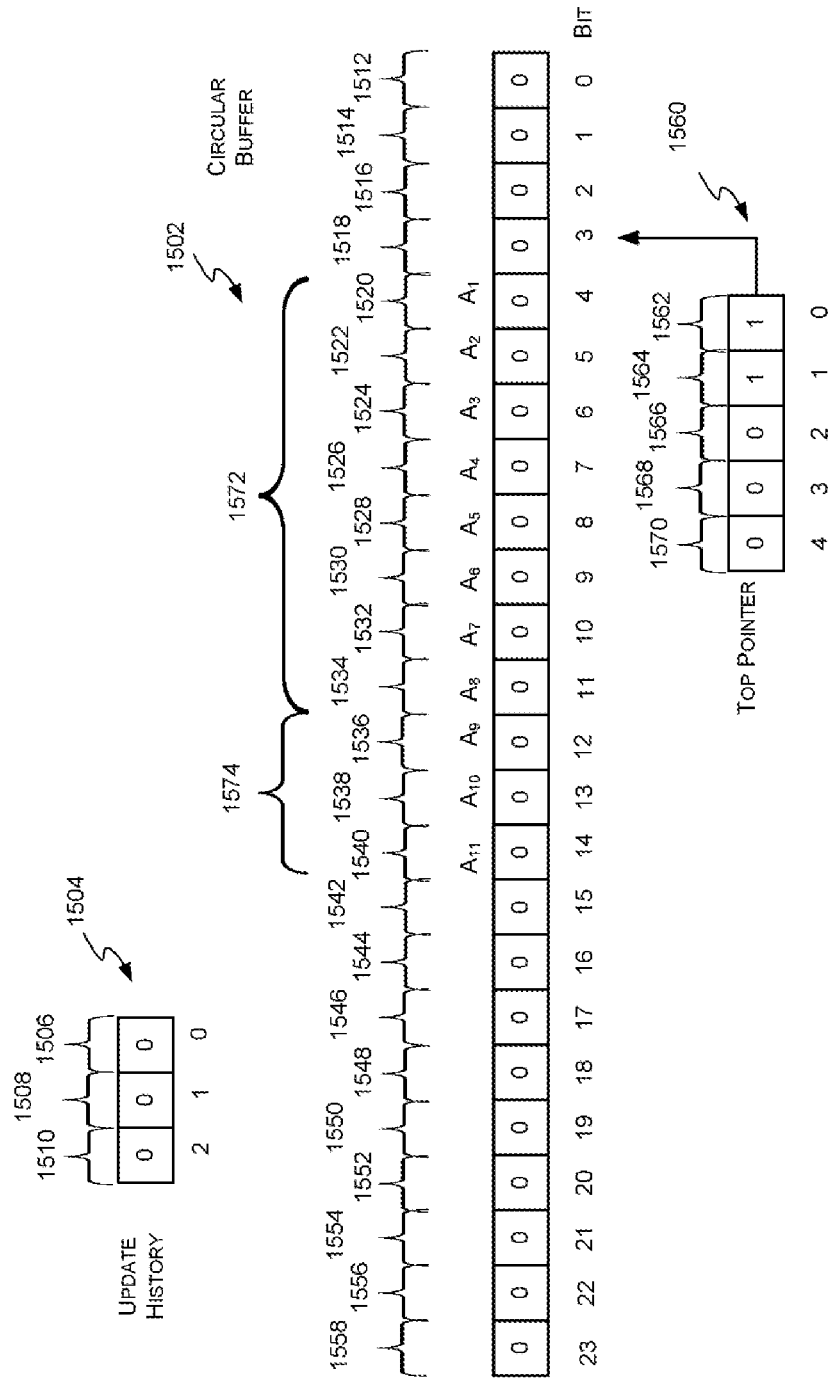
FIG. 15 is a schematic diagram of a circular buffer and an update history shift register.

FIG. 15 illustrates an example update history shift register 1504 and circular buffer 1502 for check pointing a main shift register. The update history shift register 1504 of FIG. 15 is the same as the update history shift register 604 described above with reference to FIGS. 6 to 13. In particular, it has a bit 1506 to 1510 for each check point; and in each clock cycle that a check point trigger event occurs, information (e.g. a "1" or "0") is pushed onto the update history shift register 1504 indicating whether the circular buffer 1502 has been updated in that clock cycle. Where a check point trigger event does not occur every clock cycle, then the update history shift register 1504 is not updated in clock cycles in which a check point trigger event does not occur.

The circular buffer 1502 comprises M+C+N data positions 1512-1558 for holding the M+C+N most recent data elements added to the shift register (e.g. the most recently predicted branch instruction outcomes). As described above, M is the number of different snapshots of the main shift register and check points that can be restored (e.g. the maximum number of branch instructions that can be outstanding or in-flight at any one time), C is the number of check points, and N is the size of the main shift register being check pointed.

The next data position of the circular buffer 1502 to be written to is identified by a top pointer 1560. In particular, the top pointer 1560 comprises a plurality of bits 1562 to 1570 that together form an index that identifies a particular data position 1512 to 1558 of the circular buffer 1502. For example, in FIG. 15 the index formed by the bits 1562 to 1570 of the top pointer 1560 is "00011" in binary which is equivalent to the decimal value three. Therefore the top pointer 1560 points to data position 3 (identified as numeral 1518). When a new data element is received for insertion onto the shift register, the data element is added to the data position identified by the top pointer 1560 and then the top pointer 1560 is decremented.

FIGS. 16-18 show examples of how the update history shift register 1504 and circular buffer 1502 may be updated after a check point trigger event has occurred (e.g. when an instruction is sent to the execution unit for execution). In these examples, the main shift register is an 8-bit GHR (N=8) that is check pointed three times (C=3); the GHR is updated with a "1" when a branch is predicted to be taken and a "0" when a branch is predicted to be not taken; and the update history shift register 1504 is updated with a "1" when a conditional branch instruction is sent to the execution unit (and thus a branch is predicted) and is updated with a "0" when a non-conditional branch instruction is sent to the execution unit (and thus no branch is predicted).

FIG. 16(A) shows the update history shift register 1504 and circular buffer 1502 when the IFU 202 sends a non-branch instruction to the execution unit for execution. This causes a "0" to be pushed onto the update history shift register 1504 as shown in FIG. 16(B) to indicate that the circular buffer 1502 was not updated for this instruction. The circular buffer 1502 and the top pointer are not updated.

FIG. 17(A) shows the update history shift register 1504 and circular buffer 1502 when the IFU 202 sends a conditional branch instruction that is predicted to be not taken to the execution unit for execution. This causes a "1" to be pushed onto the update history shift register 1504 to indicate that the circular buffer 1502 was updated in this clock cycle; a "0" is inserted in data position 3 of the circular buffer 1502 to indicate that a branch was predicted not to be taken; and the top pointer 1560 is decremented to "00010" (2) as shown in FIG. 17(B).

FIG. 18(A) shows the update history shift register 1504 and circular buffer 1502 when the IFU 202 sends a conditional branch instruction that is predicted to be taken to the execution unit for execution. This causes a "1" to be pushed onto the update history shift register to indicate that the circular buffer 1502 was updated in this clock cycle; a "1" to be inserted in data position 3 of the circular buffer 1502 to indicate that a branch was predicted to be taken; and the top pointer 1560 is decremented to "00010" (2) as shown in FIG. 18(B).

Referring back to FIG. 15, in addition to indicating the next data position of the circular buffer to be written to, the top pointer 1560 also identifies the active data positions $A_1$ to $A_{11}$ of the circular buffer. The active data positions $A_1$ to $A_{11}$ are those data positions of the circular buffer from which the current values of the main shift register and check points can be determined. The active data positions $A_1$ to $A_{11}$ are generally the N+C data positions preceding the data position indicated, or pointed to, by the top pointer 1560. In particular if the data position indicated, or pointed to, by the top pointer is Y, then the active data positions are data positions Y+1 through Y+N+3. For example, when the top pointer points to data position 3 (indicated by reference numeral 1420), N=8 and C=3, then the active data positions $A_1$ to $A_{11}$ are data positions 4 to 14 (indicated by reference numerals 1520 to 1540).

The active data positions $A_1$ to $A_{11}$ can be understood as being akin to the data positions 606 to 626 of the extended shift register 602 described above with reference to FIGS. 6 to 13. In particular, like the data positions 606 to 626 of the extended shift register 602, the active data positions $A_1$ to $A_{11}$ are divided into two subsets 1572 and 1574. The first subset 1572 is the N active data positions $A_1$ to $A_8$ holding the newest data elements (i.e. the data elements most recently added to the circular buffer) and represents the current state of the main shift register (e.g. GHR). The second subset 1574 is the next C data positions which hold the next C newest data elements.

For example, where the main shift register is an 8-bit GHR (N=8) which is to be checked pointed three times (C=3), then there are eleven active data positions $A_1$ to $A_{11}$ which represent the eleven most recently predicted branch outcomes. The first subset 1572 of active data positions comprises the eight most recently predicted branch outcomes, and the second subset 1574 of active data positions comprises the three next most recently predicted outcomes.

Accordingly, in the same way that the update history shift register 604 of FIGS. 6 to 13 is used to identify the current check point values from the data positions 606 to 626 of the extended shift register 602 of FIGS. 6 to 14, the update history shift register 1504 can be used to identify the current check point values from the active data positions $A_1$ to $A_{11}$. In particular, the update history shift register 1504 identifies and/or selects the active data positions $A_1$ to $A_{11}$ which provide the current value for each check point.

For example, check point generation logic may be configured to select a subset of the active data positions $A_1$ to $A_{11}$ that is offset from the first subset 1572 of active data positions by none, one, or more than one data position based on the information stored in the update history shift register 1504. The offset to be used for a particular checkpoint is based on the number of relevant data positions (e.g. bits) of the update history shift register 604 that indicate that an update was made to the circular buffer 1502 in the same clock cycle as the corresponding check point trigger event.

As described above with reference to FIGS. 6 to 13, the relevant data positions (e.g. bits) of the update history shift register 1504 for a check point is based on the level or number of the check point. In particular, the relevant data positions (e.g. bits) of the update history shift register 1504 for a check point are the data positions (e.g. bits) up to and including the level of the check point. As described above, each check point represents the value or data elements of the main shift register (e.g. GHR) a predetermined number of check point trigger events ago. The level or number of the check point is equal to the predetermined number of check point trigger events. For example, check point 1 represents the value or data elements of the main shift register (e.g. GHR) one check point trigger event ago thus check point 1 is a level 1 check point; and check point 3 represents the value or data elements of the main shift register (e.g. GHR) three check point trigger events ago thus check point 3 is a level 3 check point.

Accordingly, the offset to be used for a particular check point is based on the number of data positions (e.g. bits) of the update history shift register 1504 up to and including the level of the check point. For example, for a level 1 check point (e.g. check point 1), only the first data position of the update history shift register 1504 is relevant and for a level 2 check point (e.g. check point 2), only the first two data positions of the update history shift register 1504 are relevant. Therefore for a level 1 check point (e.g. check point 1), the offset is determined from the information in the first data position 1506 of the update history shift register 1504; and for a level 2 check point (e.g. check point 2), the offset is determined from the information in the first two data positions of the update history shift register 1504.

The offset is then equal to the number or count of the relevant data positions of the update history shift register 1504 that comprise information indicating the circular buffer 1502 was updated in the clock cycle of the corresponding check point trigger event (e.g. is set to "1"). Then the subset of active data positions for the check point is shifted one data position relative to the first subset 1572 of active data positions so that the check point comprises the first data position in the second subset 1574 of active data positions and N−1 data positions from the first subset 1572 of active data positions. If only two of the relevant data positions of the update history shift register 1504 comprise information indicating the circular buffer 1502 was updated in the clock cycle for the corresponding check point trigger event (e.g. is set to "1"), then the subset of active data positions for the check point is shifted two data positions relative to the first subset 1572 of active data positions so that the check point comprises the first two data positions from the second subset 1574 of active data positions and N−2 data positions from the first subset 1572 of active data positions.

Figure 19:
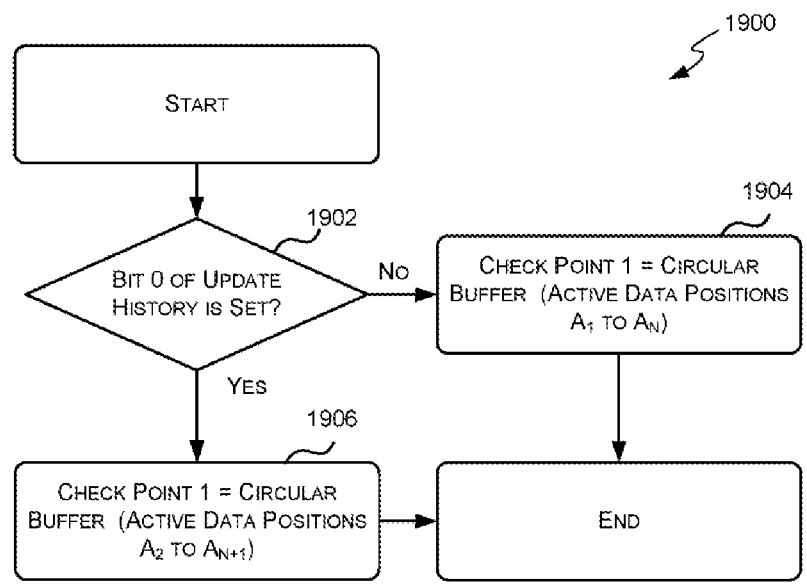
FIG. 19 is a flow diagram of an example method for obtaining the first check point from the circular buffer and the update history shift register of FIG. 15.
Figure 20:
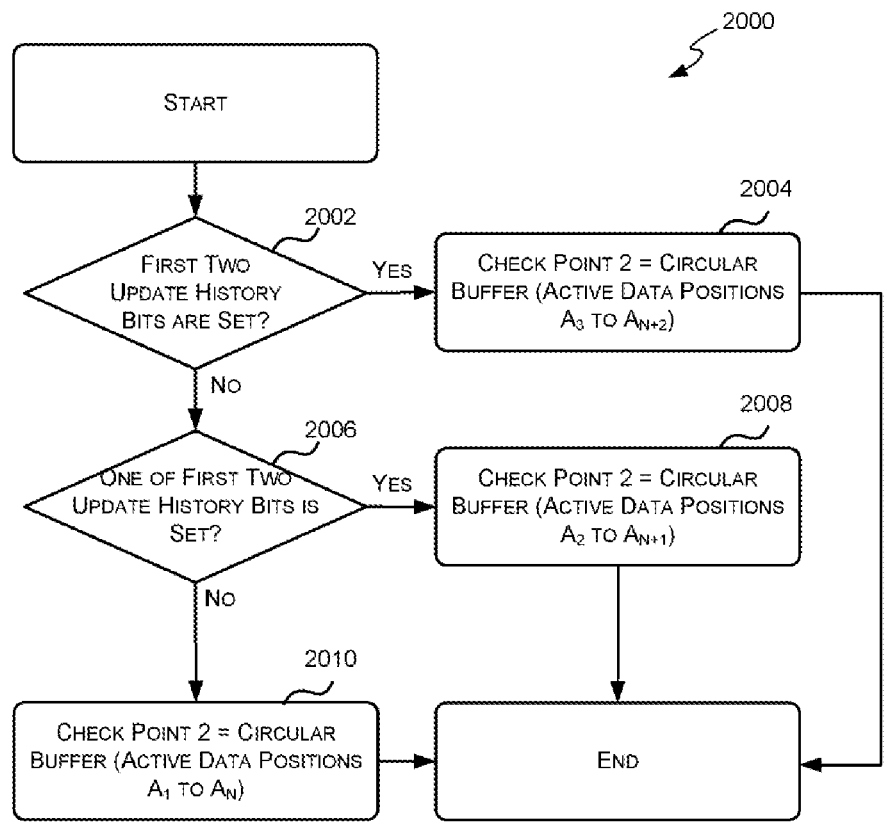
FIG. 20 is a flow diagram of an example method for obtaining the second check point from the circular buffer and the update history shift register of FIG. 15.
Figure 21:
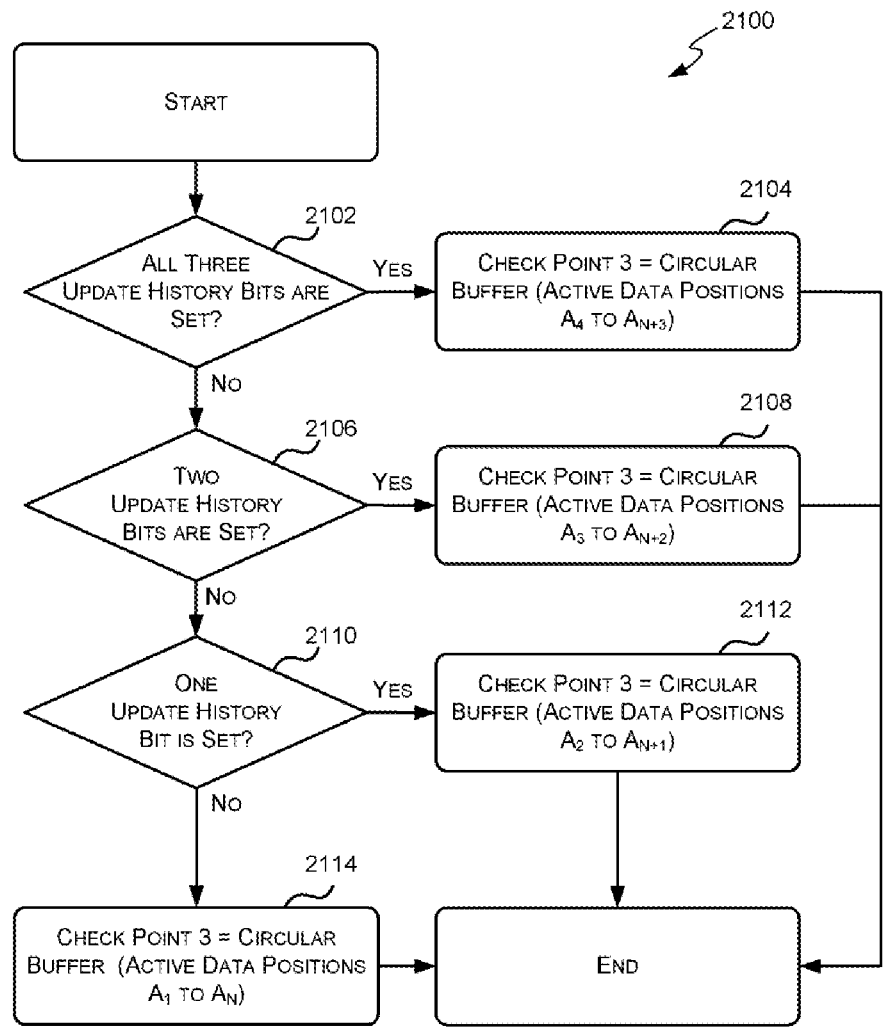
FIG. 21 is a flow diagram of an example method for obtaining the third check point from the circular buffer and the update history shift register of FIG. 15.

FIGS. 19-21 illustrate example methods for generating first, second, and third check points from the circular buffer 1502 and the update history shift register 1504 using the principles described above in relation to the extended shift register 602 and update history shift register 604. In particular, FIG. 19 illustrates an example method 1900 for generating check point 1 from the circular buffer 1502 and the update history shift register 1504 described above. Since check point 1 is a level one check point it is only the first bit (bit 0 or data position 1506) of the update history shift register 1504 that is used to determine the relevant bits from the circular buffer 1502.

The method 1900 at block 1902 where it is determined whether the first bit (e.g. bit 0 or data position 1506) of the update history shift register 1504 is set. Where a "1" is used to indicate that the circular buffer 1502 was updated in the clock cycle for the corresponding check point trigger event, determining whether the first bit of the update history shift register 1504 is set may comprise determining if the first bit is set to 1.

If it is determined that the first bit of the update history shift register 1504 is not set, then the method 1900 proceeds to block 1904 where check point 1 is set to the data elements in active data positions $A_1$ to $A_N$ (the first subset 1572 of active data positions) of the circular buffer 1502. If, however, it is determined that the first bit of the update history shift register 1504 is set, then the method 1900 proceeds to block 1906 where check point 1 is set to the data elements in active data positions $A_2$ to $A_{N+1}$ (the first active data position from the second subset 1574+the next N−1 active data positions in the first subset 1572). Accordingly, in this case, check point 1 is offset from the first subset of active data positions by one data position.

Figure 22:
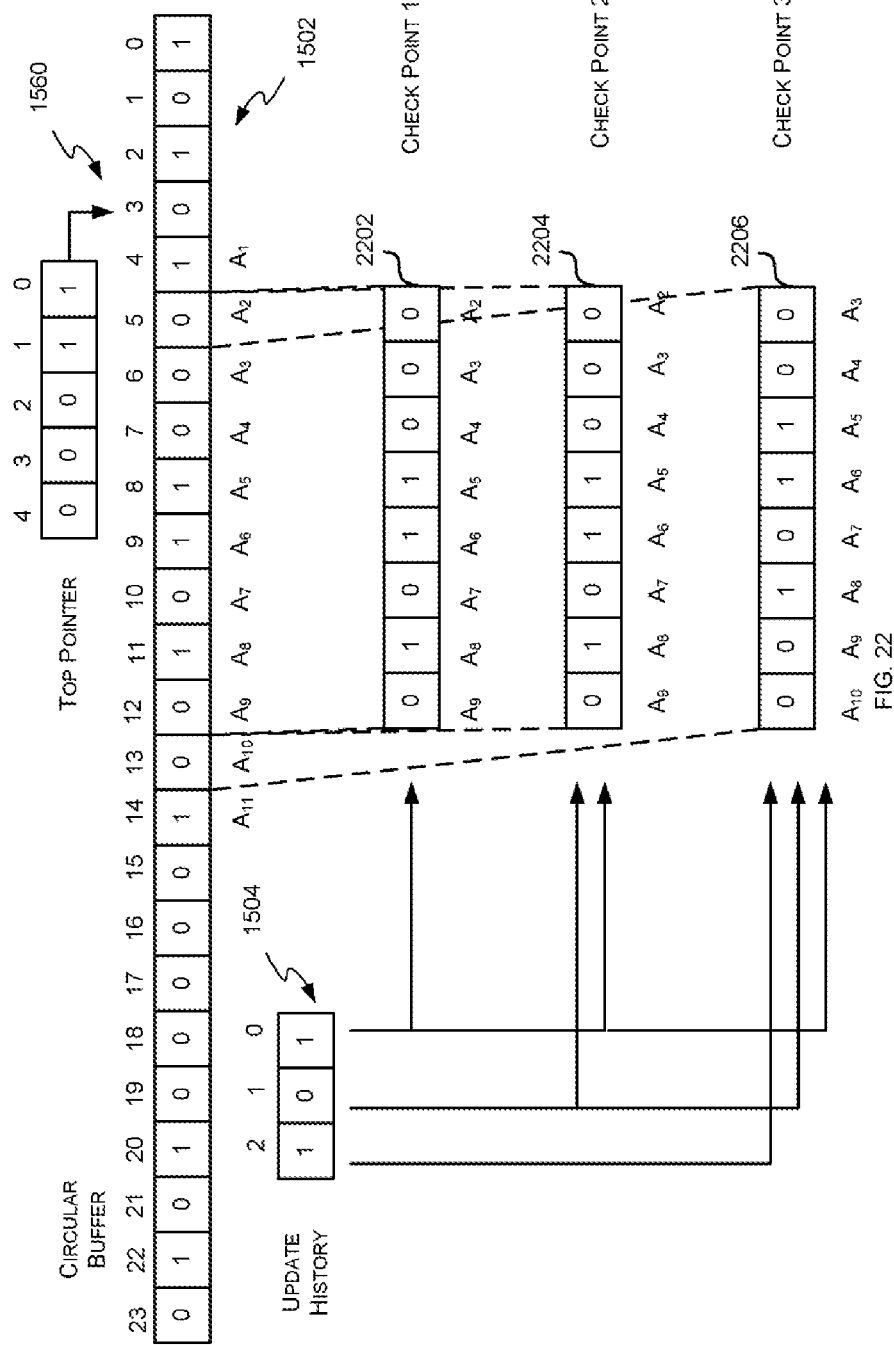
FIG. 22 is a schematic diagram of the check points that are obtained from an example circular buffer and an example update history shift register in accordance with the methods of FIGS. 19 to 21.

For example, if the main shift register is an 8-bit GHR (N=8) that is to be check pointed 3 times (C=3) and the circular buffer 1502 and the update history shift register 1504 are as shown in FIG. 22, then according to method 1900 of FIG. 19, check point 1 (indicated by reference numeral 2202) will be equal to the data in active data bits A2 to A9 of the circular buffer 1502 since the first bit of the update history shift register 1504 is set.

FIG. 20 illustrates an example method 2000 for generating check point 2 from the circular buffer 1502 and the update history shift register 1504 described above. The method 2000 begins at block 2002 where it is determined whether both of the first two bits of the update history shift register 1504 are set. If it is determined that both of the first two bits of the update history shift register 1504 are set, the method 2000 proceeds to block 2004 where check point 2 is generated from the data elements in active data positions $A_3$ to $A_{N+2}$. Accordingly, in this case, check point 2 is offset from the first subset 1572 of active data positions by two data positions.

If, however, it is determined that both of the first two bits of the update history shift register 1504 are not set, then the method 2000 proceeds to block 2006 where is it determined whether one of the first two bits of the update history shift register is set. If it is determined that one of the first two bits of the update history shift register are set, the method 2000 proceeds to block 2008 where check point 2 is generated from the data elements in active data positions $A_2$ to $A_{N+1}$. Accordingly, in this case, check point 2 is offset from the first subset 1572 of active data positions by one data position.

If, however, it is determined that none of the first two bits of the update history shift register 1504 are set, then the method 2000 proceeds to block 2010 where check point 2 is generated from the data elements in active data positions $A_1$ to $A_N$ (i.e. the first subset 1572 of data positions). Accordingly, in this case, check point 2 is offset from the first subset 1572 of active data positions by zero data positions.

For example, if the main shift register is an 8-bit GHR (N=8) that is to be check pointed 3 times (C=3) and the circular buffer 1502 and update history shift register 1504 are as shown in FIG. 22, then according to method 2000 of FIG. 20 check point 2 (indicated by numeral 2204) will be equal to the active data positions $A_2$ to $A_9$ of the circular buffer 1502 since only one of the first two bits of the update history shift register 1504 is set.

FIG. 21 illustrates an example method 2100 for generating check point 3 from the circular buffer 1502 and the update history shift register 1504 described above. The method 2100 begins at block 2102 where it is determined whether all of the first three bits of the update history shift register 1504 are set. If it is determined that all of the first three bits of the update history shift register 1504 are set, the method 2100 proceeds to block 2104 where check point 3 is generated from the data elements in active data positions $A_4$ to $A_{N+3}$. Accordingly, in this case, check point 3 is offset from the first subset 1572 of active data positions by three data positions.

If, however, it is determined that not all of the first three bits of the update history shift register 1504 are set, the method 2100 proceeds to block 2106 where it is determined whether two of the first three bits of the update history shift register 1504 are set. If it is determined that two of the first three bits of the update history shift register 1504 are set, the method 2100 proceeds to block 2108 where check point 3 is generated from the data elements in active data positions $A_3$ to $A_{N+2}$. Accordingly, in this case, check point 3 is offset from the first subset 1572 of active data positions by two data positions.

If, however, it is determined that less than two of the first three bits of the update history shift register 1504 are set, then the method 2100 proceeds to block 2110 where it is determined whether one of the first three bits of the update history shift register 1504 is set. If it is determined that one of the first three bits of the update history shift register 1504 is set, the method 2100 proceeds to block 2112 where check point 3 is generated from the data elements in active data positions $A_2$ to $A_{N+1}$. Accordingly, in this case, check point 3 is offset from the first subset 1572 of active data positions by one data position.

If, however, it is determined that none of the first three bits of the update history shift register 1504 are set, then the method 2100 proceeds to block 2114 where check point 3 is generated from the data elements in active data positions $A_1$ to $A_N$ (i.e. the first subset 1572 of active data positions).

For example, as shown in FIG. 22, if the main shift register is an 8-bit GHR (N=8) that is to be check pointed 3 times (C=3) and the circular buffer 1502 and update history shift register 1504 are as shown, then according to method 2100 of FIG. 21 check point 3 (indicated by numeral 2206) is generated from bits $A_3$ to A10 of the circular buffer 1502 since only two of the first three bits of the update history shift register 1504 are set.

Using a circular buffer 1502 and an update history shift register 1504 to check point a main shift register (e.g., GHR) as described above with reference to FIGS. 15 to 22 significantly reduces the amount of data that needs to be stored to be able to restore the main shift register (e.g. GHR) and check points to a previous point in time (e.g. after a mis-prediction of a conditional branch instruction). Specifically, instead of storing a copy of all the check points in a restoration buffer for each relevant point in time (e.g. before each outstanding conditional branch instruction was issued to the execution unit) as described above with reference to FIGS. 5(A)-5(C), only the update history shift register 1504 and the top pointer 1560 are stored in the restoration buffer for each relevant point in time (e.g. before each outstanding conditional branch instruction is issued to the execution unit). Since the circular buffer 1502 contains N+M+C predicted outcomes, it contains enough predicted outcomes that the main shift register (e.g. GHR) and associated check points for any outstanding conditional branch instruction can be recovered from the current circular buffer 1502 itself and does not require storing a copy of the circular buffer 1502.

Figure 23A:
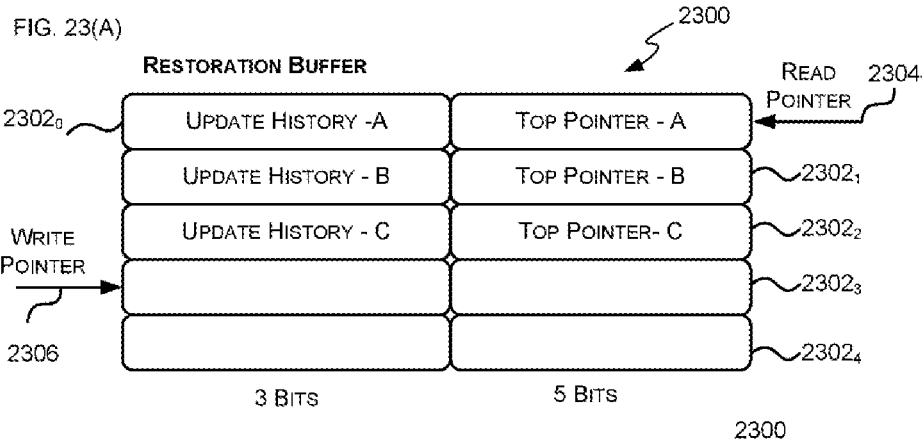
FIGS. 23(A)-23(C) are schematic diagrams of a first example restoration buffer for restoring the update history shift register and the pointer of FIG. 15.
Figure 23B:
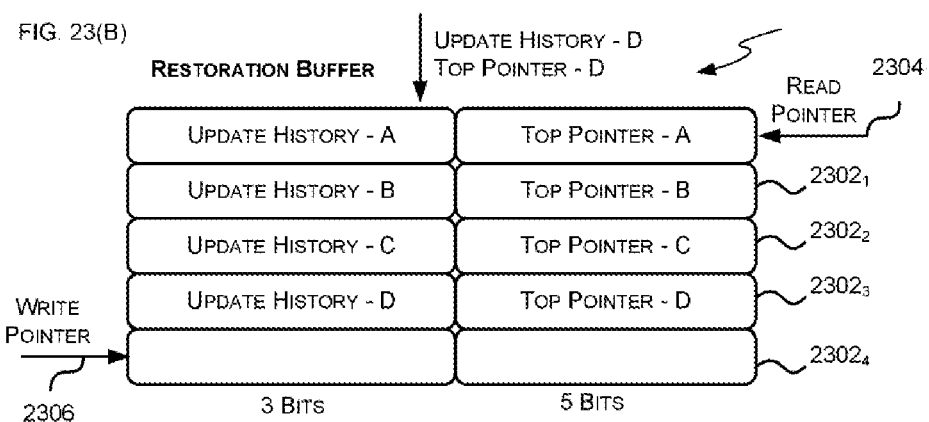
Figure 23C:
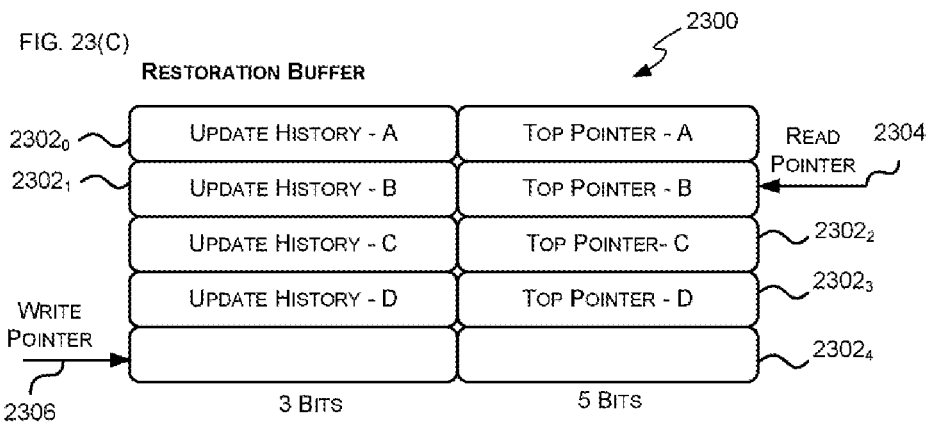

FIGS. 23(A)-23(C) illustrate a first example of a restoration buffer 2300 for restoring the main shift register and check points to a previous point in time. In this example the restoration buffer 2300 is configured to store the information in the update history shift register 1504 and the value of the top pointer 1560 for a relevant point in time (e.g. before a conditional branch instruction is sent to the execution unit for execution). Like the restoration buffers 218 and 1300 of FIGS. 5 and 13, the restoration buffer 2300 is implemented as a FIFO circular buffer which has a plurality of data positions $2302_0$ to $2302_4$ each of which is used to store a copy of the information in the update history shift register 1504 and top pointer 1560 for a particular point in time (e.g. before a conditional branch instruction is sent to the execution unit for execution); a read pointer 2304 which points to the data position $2302_0$ to $2302_4$ containing the information in the update history and value of the top pointer for the oldest relevant point in time (i.e. before the oldest pending conditional branch instruction was sent to the execution unit for execution); and a write pointer 2306 which points to the next data position $2302_0$ to $2302_4$ to be written to.

Each time an update trigger event occurs (e.g. a conditional branch instruction is issued to the execution unit), the information in the update history shift register 1504 and the value of the top pointer 1560 are pushed onto the restoration buffer 2300. In particular, the information in the update history shift register 1504 and the value of the top pointer 1560 are written to the data position indicated by the write pointer 2306 and then the write pointer 2306 is incremented to point to the next data position. For example, if the restoration buffer 2300 is as shown in FIG. 23(A) when an update trigger event occurs (e.g. a conditional branch instruction D is sent to the execution unit for execution), then the information in the update history shift register 1504 and the value of the top pointer 1560 are stored in the data position pointed to by the write pointer 2306 and then the write pointer 2306 is incremented to point to the next data position as shown in FIG. 23(B).

Each time a removal trigger event occurs (e.g. information from the execution unit (EXU) indicating that a conditional branch instruction has been executed is received), the data elements in the data position $2302_0$ to $2302_4$ pointed to by the read-pointer 2304 are popped off the restoration buffer 2300. This may be done by incrementing the read pointer 2304 to point to the next data position $2302_0$ to $2302_4$. For example, if the restoration buffer 2300 is as shown in FIG. 23(B), when a removal trigger event occurs (e.g. information is received from the EXU indicating that branch instruction A has been executed), then the read pointer 2304 is incremented to point to the next data position as shown in FIG. 23(C).

When a restoration trigger event occurs (e.g. an indication that a mis-prediction has occurred is received), then the information in the update history shift register 1504 and value of the top pointer 1560 are replaced with the data from the top data position (the data position pointed to by the read pointer 2304) and the entries in the restoration buffer 2300 are nullified. This causes the active data positions of the circular buffer 1502 to be altered so that a different set of data positions of the circular buffer 1502 is used to determine the current value of the main shift register (e.g. GHR) and check points. In other words, it moves the active data positions back to what they were at the previous point in time (e.g. before the mis-predicted branch instruction was issued to the execution unit for execution).

In this example each data position in the restoration buffer 2300 has C bits (for the update history shift register)+K bits (for the top pointer). Where there are M data positions in the restoration buffer, the total number of bits for the restoration buffer is then M*(C+K). So, where C is 3, K is 5, and M is 16, the total number of bits to implement the restoration buffer 2300 is 128. Accordingly this provides a significant cost savings in terms of storage for the restoration buffer 2300 as compared to check pointing a shift register using the method described above with reference to FIGS. 1 to 5 or the method described above with reference to FIGS. 6 to 13.

In other examples, instead of storing the value of the top pointer 1560 at a particular point in time in the restoration buffer, information enabling the top pointer 1560 to be restored to a particular point in time can be stored in the restoration buffer. As described above, the top pointer 1560 is adjusted (e.g. decremented) each time a new element is added to the circular buffer 1502. For example, where the main shift register is a GHR, a new element will be added to the circular buffer 1502 (and thus the top pointer 1560 updated) each time the outcome of a conditional branch instruction is predicted (e.g. each time a conditional branch instruction is sent to the execution unit for execution). Accordingly, if the number of circular buffer updates (e.g. conditional branch instructions sent to the execution unit) that have occurred since the particular point in time is known, the top pointer at that particular time can be generated by adjusting (e.g. incrementing) the top pointer 1560 by that number. For example, if two new elements have been added to the circular buffer after a particular point in time (e.g. after a particular instruction has been sent to the execution unit), the top pointer has been decremented twice since that point in time. Accordingly, the top pointer can be restored to that particular point in time by incrementing the top pointer by two.

This concept is illustrated using the example of FIGS. 24(A)-24(C). In this example, the main shift register is a GHR which is updated after a conditional branch instruction (for which a prediction of whether the branch is taken or not taken is made) is sent to the execution unit for execution. As shown in FIG. 24(A) the update history shift register 1504 is equal to "001", the top pointer 1560 is equal to "00011" (3), and the circular buffer 1502 is equal to "010100000100101100011101" meaning that the active data positions $A_0$ to $A_{11}$ of the circular buffer are data positions 4 to 14 of the circular buffer 1502.

If the IFU 202 subsequently sends a conditional branch instruction (instruction X) in which the branch predicted to be taken to the execution unit for execution, a "1" is pushed onto the update history shift register 1504 to indicate that the circular buffer 1502 was updated in this clock cycle; a "1" is inserted in data position 3 of the circular buffer 1502 to indicate that a branch was predicted to be taken; and the top pointer 1560 is decremented by one to "00010" (2) as shown in FIG. 24(B).

If the IFU 202 subsequently sends a conditional branch instruction (instruction X+1) in which the branch is predicted not to be taken to the execution unit for execution, a "1" is pushed onto the update history shift register 1504 to indicate that the circular buffer 1502 was updated in this clock cycle; a "0" is inserted in data position 2 of the circular buffer 1502 to indicate that a branch was predicted not to be taken; and the top pointer 1560 is decremented by one to "00001" (1) as shown in FIG. 24(C).

If it is then determined that instruction X was mis-predicted, then the update history 1504 and the top pointer 1560 are restored to the point in time before instruction X was sent to the execution unit for execution (i.e. the point in time shown in FIG. 24(A)). Since two conditional branch instructions (instruction X and instruction X+1) were sent to the execution unit since the point in time shown in FIG. 24(A) the circular buffer 1502 was updated twice and thus the top pointer 1560 was decremented twice. The top pointer 1560 can thus be restored to the point in time shown in FIG. 24(A) by incrementing the top pointer 1560 of "00001" (1) of FIG. 24(C) by two to set the top pointer 1560 back to "00011" (3). Accordingly, the top pointer 1560 can be restored to a particular point in time by keeping track of the number of times the circular buffer was updated after that point in time.

Figure 25A:
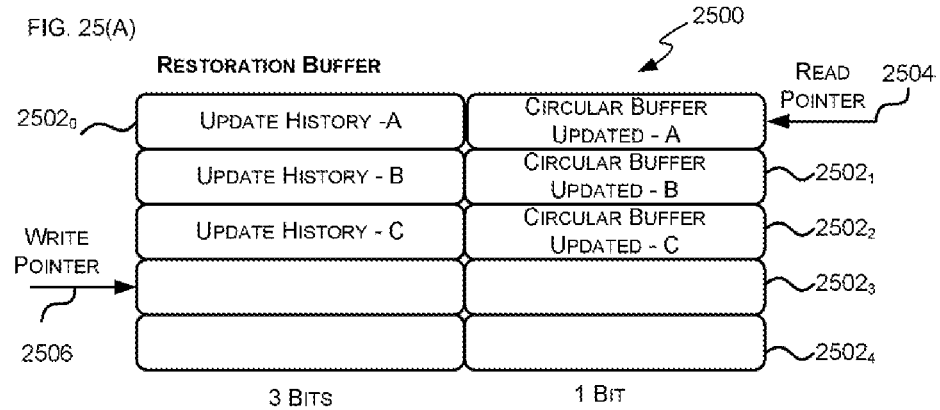
FIGS. 25(A)-25(C) are schematic diagrams of a second example restoration buffer for restoring the update history shift register and the pointer of FIG. 15.
Figure 25B:
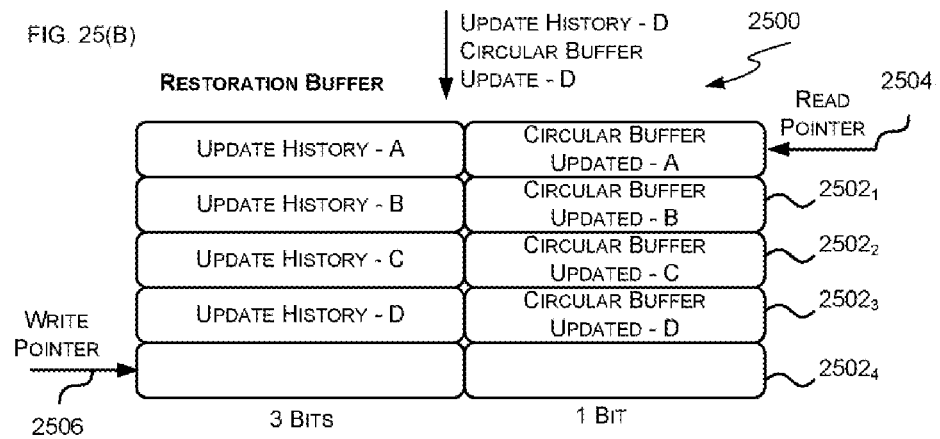
Figure 25C:
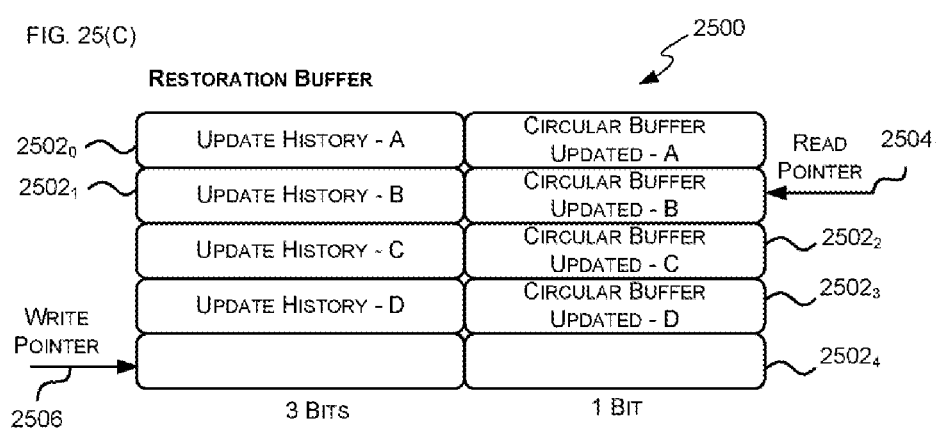

FIGS. 25(A)-25(C) illustrate a second example restoration buffer 2500 for restoring the main shift register and check points to a previous point in time. In this example the restoration buffer 2500 is configured to store the information in the update history shift register 1504 at a particular point in time (e.g. before a control transfer instruction (CTI)—an instruction that changes the direction of the program (e.g. a branch instruction, jump instruction)—is sent to the execution unit for execution) and an indication of whether the circular buffer 1502 was updated in that clock cycle. The indication of whether the circular buffer 1502 was updated may also be referred to herein as the circular buffer update indication. Where the main shift register is a GHR, then the indication of whether the circular buffer 1502 was updated is set to indicate the circular buffer 1502 was updated when a conditional branch instruction was sent to the execution unit (and thus a prediction is made of whether the branch is taken).

Like the restoration buffers 218, 1300 and 2300 of FIGS. 5, 13 and 23, the restoration buffer 2500 of FIGS. 25(A)-25(C) is implemented as a FIFO circular buffer which has a plurality of data positions $2502_0$ to $2502_4$ each of which is used to store a copy of the information in the update history shift register 1504 at a particular point in time (e.g. before a control transfer instruction (CTI), such as conditional branch instruction or a direct branch instruction is sent to the execution unit for execution) and an indication of whether the circular buffer was updated (e.g. whether the instruction sent to the execution unit was a conditional branch instruction); a read pointer 2504 which points to the data position $2502_0$ to $2502_4$ containing the information in the update history and the circular buffer update indication for the oldest relevant point in time (i.e. before the oldest pending control transfer instruction was sent to the execution unit for execution); and a write pointer 2506 which points to the next data position $2502_0$ to $2502_4$ to be written to.

Each time an update trigger event occurs (e.g. a control transfer instruction, such as a conditional branch instruction or a jump instruction, is sent to the execution unit for execution), the information in the update history shift register 1504 and an indication of whether the circular buffer 1502 was updated (e.g. whether the control transfer instruction is a conditional branch instruction) are pushed onto the restoration buffer 2500. In particular, the information in the update history shift register 1504 and an indication of whether the circular buffer was updated are written to the data position indicated by the write pointer 2506 and then the write pointer 2506 is incremented to point to the next data position. For example, if the restoration buffer 2500 is as shown in FIG. 25(A) when an update trigger even occurs (e.g. conditional branch instruction D is sent to the execution unit for execution), then the information in the update history shift register 1504 and an indication of whether the circular buffer was updated are stored in the data position pointed to by the write pointer 2506 and then the write pointer 2506 is incremented to point to the next data position as shown in FIG. 25(B).

In some cases, the indication of whether the circular buffer was updated is a single bit which is set to a "1" if the circular buffer was updated and a "0" if the circular buffer was not updated. For example, if a conditional branch instruction is sent to the execution unit for execution (which causes an update to the circular buffer as a branch prediction is made) then the information in the update history shift register 1504 and a "1" are stored in the data position pointed to by the write pointer 2506. If, however, a jump instruction is sent to the execution unit for execution (which is a CTI that does not cause an update to the circular buffer as no branch prediction was made), then the information in the update history shift register 1504 and a "0" are stored in the data position pointed to by the write pointer 2506.

Each time a removal trigger event occurs (e.g. information from the execution unit (EXU) indicating that a control transfer instruction has been executed is received), the data elements in the data position $2502_0$ to $2502_4$ pointed to by the read-pointer 2504 are popped off the restoration buffer 2500. This may be done by incrementing the read pointer 2504 to point to the next data position $2502_0$ to $2502_4$. For example, if the restoration buffer 2500 is as shown in FIG. 25(B), when a removal trigger event occurs (e.g. information is received from the EXU indicating that control transfer instruction A has been executed), then the read pointer 2504 is incremented to point to the next data position as shown in FIG. 25(C).

When a restoration trigger event occurs (e.g. an indication that a mis-prediction has occurred is received), then the information in the update history shift register 1504 and value of the top pointer 1560 are replaced based on data from the top data position (the data position pointed to by the read pointer 2504) and the entries in the restoration buffer 2500 are nullified. In particular, the information in the update history shift register 1504 is replaced with the update history shift register information in the top data position of the restoration buffer; and the number of data positions of the restoration buffer 2500 that indicate a branch prediction were made are counted and this count is used to update the top pointer 1560 (e.g. the top pointer may be incremented by this count).

This change to the top pointer 1560 causes the active data positions of the circular buffer 1502 to be altered so that a different set of data positions of the circular buffer 1502 are used to determine the current value of the main shift register (e.g. GHR) and check points. In other words, it moves the active data positions back to what they were at the previous point in time (e.g. before the mis-predicted instruction was issued to the execution unit for execution). An example showing the circular buffer 1502, top pointer 1560, update history shift register 1504 and restoration buffer 2500 after a restoration event will be described with reference to FIGS. 26(A)-26(B).

In this example restoration buffer 2500, each data position in the restoration buffer 2500 has C bits (for the update history shift register)+1 bit for the circular buffer update indicator. Where there are M data positions in the restoration buffer, the total number of bits for the restoration buffer 2500 is then $M*(C+1)$. So, where C is 3, and M is 16 the total number of bits to implement the restoration buffer 2300 is only 64.

FIGS. 26(A)-26(B) show an example of the circular buffer 1502, top pointer 1560, update history shift register 1504 and restoration buffer 2500 after a restoration event. In particular, in FIG. 26(A) the update history shift register 1504 is equal to "001", the top pointer 1560 is equal to "00011" (3), and the circular buffer 1502 is equal to "0101000001001011000011101" meaning that the active data positions A0 to A11 of the circular buffer are data positions 4 to 14.

If a restoration event (e.g. a mis-prediction of instruction X) subsequently occurs, then the update history shift register 1504 and top pointer 1560 are updated as shown in FIG. 26(B) based on the information in the restoration buffer 2500 to restore them to what they were before instruction X was sent to the execution unit for execution. In particular, the information in the update history shift register 1504 is replaced with the update history shift register information in the top data position (i.e. the data position pointed to by the read pointer 2502). In the example of FIG. 26(A) the update history shift register information in the top data position $2502_0$ is "101" so after the restoration event the update history shift register 1504 is set to "101" as shown in FIG. 26(B).

The number of circular buffer update indicators is also counted and used to restore the top pointer 1560 to its value prior to instruction X being sent to the execution unit for execution. In the example of FIGS. 26(A)-26(B), the restoration buffer has two data positions ($2502_0$ and $2502_2$) where the circular buffer update indicator is set indicating that two branch predictions (thus two updates to the circular buffer 1502) have been made since before instruction X was issued to the execution unit for execution. Accordingly the top pointer 1560 is restored to its value prior to instruction X being sent to the execution unit for execution by adding two to the top pointer 1560. In particular, prior to the restoration event the top pointer was "00011" so to restore the top pointer 1560 to its value prior to instruction X being sent to the execution unit for execution the top pointer value "00011" is incremented by two to "00101" (5).

It can be seen from FIGS. 26(A)-26(B) that this changes the active data positions of the circular buffer from data positions 4 to 14 back to data positions 6 to 16.

Once the update history shift register 1504 and top pointer 1560 have been restored, the data in the restoration buffer 2500 is invalidated. This may involve setting the write pointer 2506 and read pointer 2504 to point to the same data position indicating the restoration buffer 2500 is empty.

Figure 27:
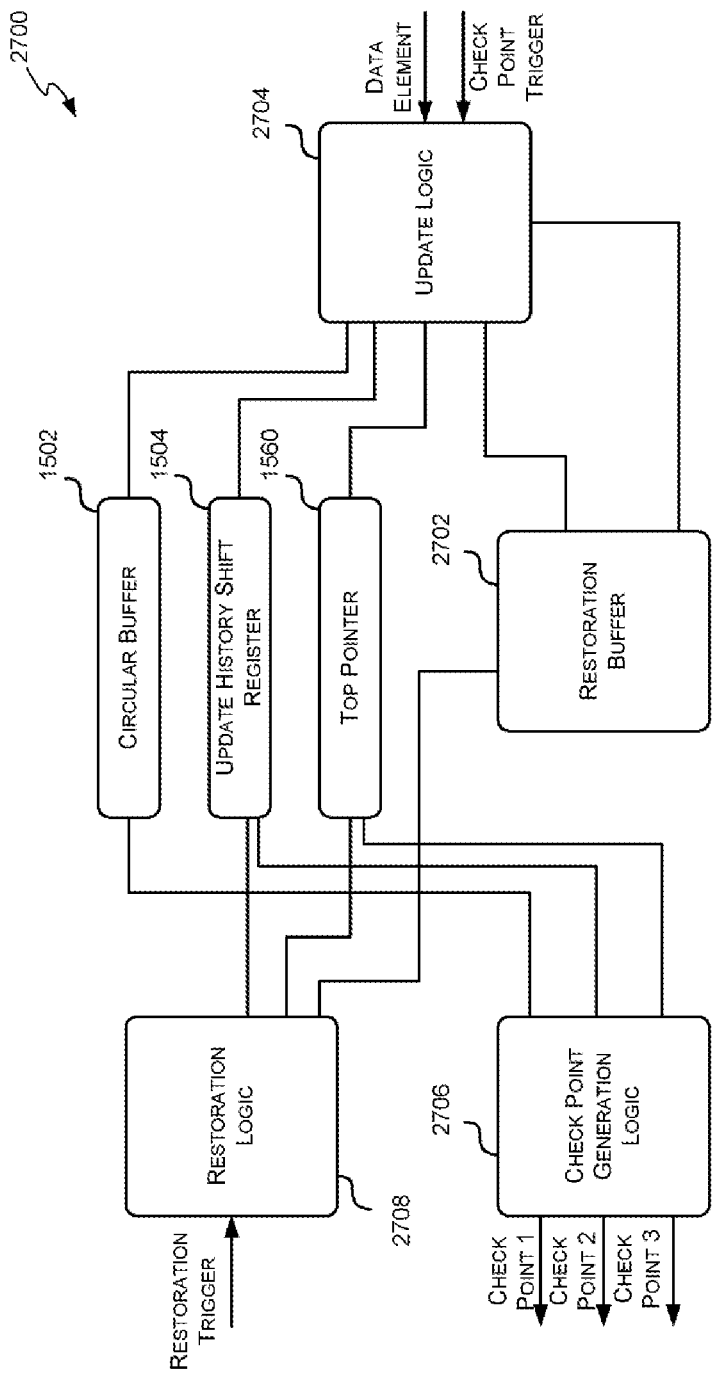
FIG. 27 is a block diagram of an example hardware structure for check pointing a shift register.

FIG. 27 illustrates an example hardware structure 2700 for implementing the shift register check pointing method described above with reference to FIGS. 15 to 26. The hardware structure 2700 comprises the circular buffer 1502, update history shift register 1504 and top pointer 1560 described above. The hardware structure 2700 also comprises a restoration buffer 2702 which may be, for example, the restoration buffer 2300 of FIGS. 23(A)-23(C) or the restoration buffer 2500 of FIGS. 25(A)-25(C).

The hardware structure also comprises update logic 2704 for updating the circular buffer 1502, the update history shift register 1504, the top pointer 1560, and the restoration buffer 2702 as described above. In particular, the update logic 2704 is configured to receive new data elements for the main shift register (e.g. GHR) and update the circular buffer 1502, the update history shift register 1504, the top pointer 1560, and the restoration buffer 2702 accordingly as described with reference to FIGS. 16-18, and 23-26. For example, where the shift register being check pointed is a GHR, the new data elements to be added to the GHR may be the predicted outcome of a conditional branch instruction.

The hardware structure also comprises check point generation logic 2706 for generating the check points and/or main shift register from the circular buffer 1502, the update history shift register 1504 and the top pointer 1560 as described above with reference to FIGS. 19-22. For example, the check point generation logic 2706 may be configured to implement one or more of the methods described with reference to FIGS. 19 to 21.

The hardware structure 2700 may also comprise restoration logic 2708 for restoring the update history shift register 1504 and top pointer 1560 to a previous point in time based on the information stored in the restoration buffer 2702 upon receiving notification of a restoration trigger event (e.g. mis-prediction of a conditional branch instruction) as described above with reference to FIGS. 23-26.

For example, where the restoration buffer 2702 is configured to store copies of the update history shift register 1504 and top pointer 1560 at particular points in time (e.g. as described with reference to FIGS. 23(A)-23(C)), when the restoration logic 2708 is notified of a restoration trigger event the restoration logic 2708 may be configured to replace the update history shift register 1504 and the top pointer 1560 with the values stored in the restoration buffer 2702. Where, however, the restoration buffer 2702 is configured to store a copy of the update history shift register 1504 and information indicating whether the circular buffer 1502 was updated (e.g. as described with reference to FIGS. 24-26), when the restoration logic 2708 is notified of a restoration trigger event the restoration logic 2708 may be configured to replace the update history shift register 1504 with the update history shift register data stored in the restoration buffer 2702 and update the value of the top pointer 1560 based on the information indicating whether the circular buffer 1502 was updated.

A first further example provides a hardware structure configured to derive one or more check points for a main shift register having a predetermined number of data positions, the hardware structure comprising: an extended shift register comprising a data position for each data position of the main shift register and an additional data position for each check point, the data positions of the extended shift register storing data elements most recently shifted onto the main shift register; an update history shift register comprising a data position for each check point, each data position of the update history register storing information indicating whether the extended shift register was updated in a same clock cycle as a particular check point trigger event; and check point generation logic configured to derive each check point by selecting a subset of the data positions of the extended shift register based on the information stored in the update history shift register.

A second further example provides a method to derive one or more check points for a main shift register having a predetermined number of data positions, the method comprising: storing the predetermined number of data elements most recently shifted onto the main shift register in a plurality of data positions of an extended shift register; storing an additional data element for each check point in an extra data position of the extended shift register; storing information indicating whether the extended shift register was updated in a same clock cycle as a particular check point trigger event in a data position of an update history shift register; and deriving each check point by selecting a subset of the data positions of the extended shift register based on the information stored in the update history shift register.

A third further example provides a hardware structure to derive one or more check points for a main shift register having a predetermined number of data positions and being restorable to a plurality of points in time, the hardware structure comprising: a circular buffer comprising a data position for each data position of the main shift register, an additional data position for each check point, and an additional data position for each of the plurality of points in time, the data positions of the circular buffer storing data elements most recently shifted onto the main shift register; a pointer configured to identify a plurality of active data positions of the circular buffer, the active data positions comprising a subset of the data positions of the circular buffer storing the data elements most recently written to the circular buffer; an update history shift register having a data position for each check point, the data positions of the update history shift register storing information indicating whether the circular buffer was updated in a same clock cycle as a particular check point trigger event; and check point generation logic configured to derive each check point by selecting a subset of the active data positions based on the information stored in the update history shift register.

A fourth further example provides a method to derive one or more check points for a main shift register having a predetermined number of data positions and being restorable to a plurality of periods of time, the method comprising: storing the predetermined number of data elements recently shifted onto the main shift register in a plurality of data positions of a circular buffer; storing an additional data element for each check point in an extra data position of the circular buffer; storing an additional data element for each period of time in the plurality of periods of time in extra data positions of the circular buffer; storing an index to the circular buffer in a pointer, the index identifying active data positions of the circular buffer; storing information indicating whether the circular buffer was updated in a same clock cycle as a particular check point trigger event in a data position of an update history shift register; and deriving each check point by selecting a subset of the active data positions based on the information stored in the update history shift register.

The methods described herein may be performed by a computer configured with software in machine readable form stored on a tangible storage medium, e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc., and do not include propagated signals. The software can be suitable for execution on a parallel processor or a serial processor such that the method steps may be carried out in any suitable order, or simultaneously.

The term 'processor' and 'computer' are used herein to refer to any device, or portion thereof, with processing capability such that it can execute instructions. The term 'processor' may, for example, include central processing units (CPUs), graphics processing units (GPUs or VPUs), physics processing units (PPUs), radio processing units (RPUs), digital signal processors (DSPs), general purpose processors (e.g. a general purpose GPU), microprocessors, any processing unit which is designed to accelerate tasks outside of a CPU, etc. Those skilled in the art will realize that such processing capabilities are incorporated into many different devices and therefore the term 'computer' includes set top boxes, media players, digital radios, PCs, servers, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all or a portion of the software instructions may be carried out by a dedicated circuit, such as a DSP, programmable logic array, or the like.

The methods described herein may be performed by a computer configured with software in machine readable form stored on a tangible storage medium, e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards, etc., and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

It is also intended to encompass software which "describes" or defines the configuration of hardware that implements a module, functionality, component or logic described above, such as HDL (hardware description language) software, as is used for designing integrated circuits, or for configuring programmable chips, to carry out desired functions. That is, there may be provided a computer readable storage medium having encoded thereon computer readable program code for generating a processing unit configured to perform any of the methods described herein, or for generating a processing unit comprising any apparatus described herein. That is, a computer system may be configured to generate a representation of a digital circuit from definitions of circuit elements and data defining rules for combining those circuit elements, wherein a non-transitory computer readable storage medium may have stored thereon processor executable instructions that when executed at such a computer system, cause the computer system to generate a processing unit as described herein. For example, a non-transitory computer readable storage medium may have stored thereon computer readable instructions that, when processed at a computer system for generating a manifestation of an integrated circuit, cause the computer system to generate a manifestation of a processor of a receiver as described in the examples herein or to generate a manifestation of a processor configured to perform a method as described in the examples herein. The manifestation of a processor could be the processor itself, or a representation of the processor (e.g. a mask) which can be used to generate the processor.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, and resistive RAM.

A particular reference to "logic" refers to structure that performs a function or functions. An example of logic includes circuitry that is arranged to perform those function (s). For example, such circuitry may include transistors and/or other hardware elements available in a manufacturing process. Such transistors and/or other elements may be used to form circuitry or structures that implement and/or contain memory such as registers; flip flops or latches; logical operators, such as Boolean operations; mathematical operators, such as adders, multipliers, or shifters; and interconnectors, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to an item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

What is claimed is:

1. A hardware structure for check pointing comprising:
   a main shift register;
   a circular buffer having a plurality of data positions for storing data elements, wherein the plurality of data positions includes a data position for each data position of the main shift register, an additional data position for each of one or more check points of the main shift register, and an additional data position for each of a plurality of points in time;
   a pointer configured to identify a plurality of active data positions from the plurality of data positions of the circular buffer;
   an update history shift register having a data position for each check point; and
   check point generation logic configured to derive each check point for restoration based on selecting a subset of the plurality of active data positions identified by the pointer and on information stored in the update history shift register.

2. The hardware structure of claim 1 wherein the main shift register is restorable to a plurality of points in time.

3. The hardware structure of claim 1 wherein the check points are triggered by check point trigger events.

4. The hardware structure of claim 3 wherein the number of check points is at least two, and the check point generation logic is configured to derive a second check point representing the main shift register prior to the two most recent check point trigger events by:
   counting the number of the first two data positions of the update history shift register that comprise information indicating that the circular buffer was updated; and
   selecting a subset of the plurality of active data positions that is offset from the first subset of data positions by the count.

5. The hardware structure of claim 1 wherein data positions of the update history shift register store information indicating whether the circular buffer was updated in a same clock cycle as a particular check point trigger event.

6. The hardware structure of claim 1 wherein the main shift register comprises a global history register for tracking conditional branch instruction outcomes.

7. The hardware structure of claim 1 wherein the active data positions include a first subset of the plurality of data positions of the circular buffer that represent the main shift register and an additional data position for each check point.

8. The hardware structure of claim 7 wherein a selected subset of the plurality of active data positions for a particular check point can have an offset from the first subset of data positions by none, one, or more than one data position.

9. The hardware structure of claim 8 wherein the check point generation logic is configured to determine the offset from the first subset of data positions for a particular check point by evaluating the information stored in a number of relevant data positions of the update history shift register.

10. The hardware structure of claim 9 wherein each check point represents the main shift register prior to a number of check point trigger events; and the number of relevant data positions of the update history shift register for a particular check point is equal to the number of check point trigger events for that check point.

11. The hardware structure of claim 9 wherein the offset is equal to a count of relevant data positions of the update history shift register that comprise information indicating that the circular buffer was updated.

12. The hardware structure of claim 8 wherein the check point generation logic is configured to derive a first check point representing the main shift register prior to a most recent check point trigger event by:
   determining, in the check point generation logic, whether a first data position of the update history shift register comprises information indicating that the circular buffer was updated;
   in response to determining that the first data position of the update history shift register comprises information, indicating that the circular buffer was not updated, selecting, in the check point generation logic, the first subset of data positions of the circular buffer; and
   in response to determining, in the check point generation logic, that the first data position of the update history shift register comprises information indicating that the circular buffer was updated, selecting, in the check point generation logic, a subset of the plurality of active data positions that is offset from the first subset of data positions by one data position.

13. The hardware structure of claim 1 further comprising update logic configured to, in each clock cycle:
   determine, in the update logic, whether a check point trigger event has occurred;
   in response to determining that a check point trigger event has occurred, determine, in the update logic, whether the circular buffer is updated in the current clock cycle;

in response to determining that the circular buffer is updated in the current clock cycle, shift information onto the update history shift register indicating the circular buffer has been updated; and in response to determining that the circular buffer is not updated in the current clock cycle, shift information onto the update history shift register indicating the circular buffer has not been updated.

14. The hardware structure of claim 1 further comprising a restoration buffer having a plurality of data positions, each data position of the restoration buffer storing a copy of information of the update history shift register and a copy of the pointer at a particular point in time.

15. The hardware structure of claim 14 further comprising restoration logic, the restoration logic configured to, in response to receiving an indication that a restoration is to be performed, restore the update history shift register and the pointer to a particular point in time using the copies stored in the restoration buffer.

16. The hardware structure of claim 15 wherein the main shift register is a global history register and each data element of the global history register indicates a predicted outcome for a conditional branch instruction; and the indication that a restoration is to be performed is an indication that a conditional branch instruction was mis-predicted.

17. The hardware structure of claim 1 wherein the main shift register is a global history register and each data element of the global history register indicates a predicted outcome for a conditional branch instruction.

18. The hardware structure of claim 1 wherein the hardware structure comprises a processor.

19. The hardware structure of claim 1 wherein the hardware structure comprises an instruction fetch unit.

20. A method for deriving one or more check points for a main shift register comprising:

storing data elements in a plurality of data positions of a circular buffer, the plurality of data positions including a data position for each data position of the main shift register, an additional data position for each check point, and an additional data position for each of a plurality of points in time;

storing an index to the circular buffer in a pointer;

storing information indicating whether the circular buffer was updated in a same clock cycle as a particular check point trigger event in a data position of an update history shift register; and deriving each check point by selecting, with hardware logic, a subset of a plurality of active data positions based on the information stored in the update history shift register.

21. The method of claim 20 wherein the index identifies a plurality of active data positions of the plurality of data positions of the circular buffer, wherein the plurality of active data positions include a first subset of the plurality of data positions of the circular buffer that represent the main shift register and an additional data position for each check point.

22. The method of claim 20 wherein a selected subset of the plurality of active data positions for a particular check point can be offset from the first subset of data positions by none, one, or more than one data position.

23. The method of claim 22 wherein the offset from the first subset of data positions for a particular check point is determined by the hardware logic evaluating the information stored in a number of relevant data positions of the update history shift register.

24. The method of claim 23 wherein each check point represents the main shift register prior to a number of check point trigger events; and the number of relevant data positions of the update history shift register for a particular check point is equal to the number of check point trigger events for that check point.

25. The method of claim 23 wherein the offset is equal to a count of relevant data positions of the update history shift register that comprise information indicating that the circular buffer was updated.

26. The method of claim 20 further comprising storing a copy of the information of the update history shift register and a copy of the pointer at a particular point in time in a data position in a restoration buffer.

* * * * *